US012217443B2

(12) United States Patent
Zhang et al.

(10) Patent No.: US 12,217,443 B2
(45) Date of Patent: Feb. 4, 2025

(54) DEPTH IMAGE GENERATION METHOD, APPARATUS, AND STORAGE MEDIUM AND ELECTRONIC DEVICE

(71) Applicant: TENCENT TECHNOLOGY (SHENZHEN) COMPANY LTD, Guangdong (CN)

(72) Inventors: Runze Zhang, Shenzhen (CN); Hongwei Yi, Shenzhen (CN); Ying Chen, Shenzhen (CN); Shang Xu, Shenzhen (CN); Yu Wing Tai, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 408 days.

(21) Appl. No.: 17/714,654

(22) Filed: Apr. 6, 2022

(65) Prior Publication Data
US 2022/0230338 A1  Jul. 21, 2022

Related U.S. Application Data

(63) Continuation of application No. PCT/CN2020/127891, filed on Nov. 10, 2020.

(30) Foreign Application Priority Data

Feb. 26, 2020 (CN) .......................... 202010119713.5

(51) Int. Cl.
*G06T 7/50* (2017.01)
*G06F 18/25* (2023.01)
*G06T 7/55* (2017.01)

(52) U.S. Cl.
CPC .............. *G06T 7/55* (2017.01); *G06F 18/253* (2023.01); *G06T 2207/10028* (2013.01); *G06T 2207/20081* (2013.01); *G06T 2207/20084* (2013.01)

(58) Field of Classification Search
CPC ............ G06T 7/55; G06T 2207/10028; G06T 2207/20081; G06T 2207/20084;
(Continued)

(56) References Cited

U.S. PATENT DOCUMENTS

| 10,482,334 | B1 | 11/2019 | Chen et al. |
| 11,017,586 | B2 * | 5/2021 | Long ..................... G06T 15/205 |
| 2020/0086879 | A1 * | 3/2020 | Lakshmi Narayanan .................. G06V 20/597 |

FOREIGN PATENT DOCUMENTS

| CN | 109461180 A | * | 3/2019 | ............. G06T 17/00 |
| CN | 109905691 A |   | 6/2019 | |

(Continued)

OTHER PUBLICATIONS

Hongwei Yi, et al., "Pyramid Multi-view Stereo Net with Self-adaptive View Aggregation", arXiv:1912.03001v2 [cs.CV], Jul. 21, 2020, (1-16 pages total).

(Continued)

Primary Examiner — Neil R McLean
(74) Attorney, Agent, or Firm — Sughrue Mion, PLLC

(57) ABSTRACT

A depth image generation method, apparatus, and storage medium and electronic device. The method includes: acquiring a plurality of target images; performing multi-stage convolution processing on the plurality of target images through a plurality of convolutional layers in a convolution model to obtain feature map sets respectively outputted by the plurality of convolutional layers; performing view aggregation on a plurality of feature maps in each feature map set respectively to obtain an aggregated feature corresponding to each feature map set; and performing fusion processing on the plurality of obtained aggregated features to obtain a depth image. The plurality of acquired target images are obtained by photographing the target object from different views respectively, so that the plurality of obtained target (Continued)

images include information from different angles, which enriches information content of the acquired target images.

18 Claims, 9 Drawing Sheets

(58) Field of Classification Search
CPC . G06T 2207/10024; G06T 2207/20076; G06T 2207/10004; G06T 2207/20221; G06F 18/253; G06V 10/454; G06V 10/806; G06V 10/82; G06N 3/045; G06N 3/08
USPC ............................................. 382/156
See application file for complete search history.

(56) References Cited

FOREIGN PATENT DOCUMENTS

| | | |
|---|---|---|
| CN | 110021069 A | 7/2019 |
| CN | 110378943 A | 10/2019 |
| CN | 110457515 A | 11/2019 |
| CN | 110543581 A | 12/2019 |
| CN | 111340866 A | 6/2020 |

OTHER PUBLICATIONS

Yao Yao, et al., "MVSNet: Depth Inference for Unstructured Multi-view Stereo", arXiv:1804.02505v2 [cs.CV], Jul. 17, 2018, (1-17 pages total).

Translation of the Written Opinion issued Feb. 10, 2021 in International Application No. PCT/CN2020/127891.

Po-Han Huang et al., "DeepMVS: Learning Multi-view Stereopsis," Apr. 2, 2018, arXiv: 1804.00650v1 (10 pages).

International Search Report for PCT/CN2020/127891, dated Feb. 10, 2021.

Written Opinion for PCT/CN2020/127891, dated Feb. 10, 2021.

* cited by examiner

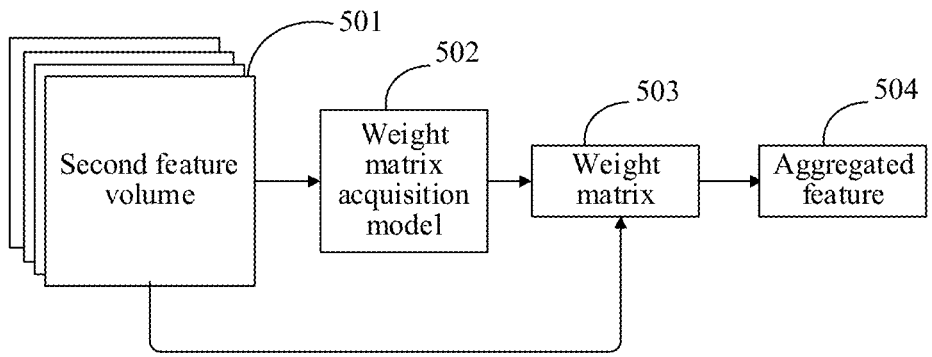

FIG. 5

| Regard, by a computer device, an aggregated feature of the largest scale in the plurality of aggregated features as a first aggregated feature, and regard a plurality of other aggregated features in the plurality of aggregated features as second aggregated features | 2041 |

| Perform, by the computer device, multi-stage convolution processing on the first aggregated feature to obtain a plurality of third aggregated features | 2042 |

| Perform, by the computer device, fusion processing on the second aggregated feature of the first scale and the third aggregated feature of the first scale, and perform deconvolution processing on the fused feature to obtain a fourth aggregated feature of the second scale | 2043 |

| Perform, by the computer device, fusion processing continuously on the currently obtained fourth aggregated feature, as well as the second aggregated feature and the third aggregated feature that are of scales equal to that of the fourth aggregated feature, and perform deconvolution processing on the fused feature to obtain a fourth aggregated feature of a previous-level scale, until a fourth aggregated feature of a scale equal to that of the first aggregated feature is obtained The fused feature and the currently obtained fourth aggregated feature are of the same scale. | 2044 |

| Perform, by the computer device, fusion processing on the currently obtained fourth aggregated feature and the first aggregated feature to obtain a fifth aggregated feature | 2045 |

| Perform, by the computer device, convolution processing according to the fifth aggregated feature and a probability map corresponding to the first aggregated feature to obtain a depth image | 2046 |

FIG. 6

DEPTH IMAGE GENERATION METHOD, APPARATUS, AND STORAGE MEDIUM AND ELECTRONIC DEVICE

CROSS-REFERENCE TO RELATED APPLICATION(S)

This application is a continuation application filed with the Chinese Intellectual No. PCT/CN2020/127891 filed on Nov. 10, 2020, which claims the priority to Chinese Patent Application No. 202010119713.5 filed on Feb. 26, 2020, the disclosures of which are incorporated by reference in their entireties.

FIELD

The disclosure relates to the field of computer technologies, and in particular, to a depth image generation method, apparatus, and storage medium and electronic device.

BACKGROUND

With the development of computer technologies, the application of three-dimensional models is becoming increasingly more extensive. The three-dimensional models may be applied to various scenarios, such as scenarios of three-dimensional model construction of buildings, and scenarios of three-dimensional model construction of human bodies. During generation of a three-dimensional model of an object, a depth image of the object needs to be generated first, and how to generate a depth image becomes an urgent problem to be solved.

SUMMARY

The embodiments of the disclosure provide a depth image generation method, apparatus, and storage medium, which can improve the accuracy of a depth image. The technical solution is as follows:

In one aspect, a depth image generation method may be provided, the method including: acquiring a plurality of target images, the plurality of target images being obtained respectively by photographing a target object from different views; performing multi-stage convolution processing on the plurality of target images through a plurality of convolutional layers in a convolution model to obtain feature map sets respectively outputted by the plurality of convolutional layers, each feature map set including feature maps corresponding to the plurality of target images; performing view aggregation on a plurality of feature maps in each feature map set respectively to obtain an aggregated feature corresponding to each feature map set; and performing fusion processing on the plurality of obtained aggregated features to obtain a depth image.

In another aspect, a depth image generation apparatus may be provided, the apparatus including: at least one memory configured to store computer program code; and at least one processor configured to read the computer program code and operate as instructed by the computer program code, the computer program code comprising: image acquisition code configured to cause the at least one processor to acquire a plurality of target images, the plurality of target images being obtained respectively by photographing a target object from different views; convolution processing code configured to cause the at least one processor to perform multi-stage convolution processing on the plurality of target images through a plurality of convolutional layers in a convolution model to obtain feature map sets respectively outputted by the plurality of convolutional layers, each feature map set including feature maps corresponding to the plurality of target images; view aggregation code configured to cause the at least one processor to perform view aggregation on a plurality of feature maps in each feature map set respectively to obtain an aggregated feature corresponding to each feature map set; and feature fusion code configured to cause the at least one processor to perform fusion processing on the plurality of obtained aggregated features to obtain a depth image.

In another aspect, a computer device may be provided, the computer device includes a processor and a memory, at least one piece of program code is stored in the memory, and the at least one piece of program code is loaded and executed by the processor to implement the depth image generation method described in the above aspect.

In another aspect, a non-transitory computer-readable storage medium may be provided, at least one piece of program code is stored in the computer-readable storage medium, and the at least one piece of program code is loaded and executed by a processor to implement the depth image generation method described in the above aspect.

In the method, apparatus, and storage medium and electronic device provided by the embodiments of the disclosure, a plurality of target images are acquired, the plurality of target images being obtained respectively by photographing a target object from different views; multi-stage convolution processing is performed on the plurality of target images through a plurality of convolutional layers in a convolution model to obtain feature map sets respectively outputted by the plurality of convolutional layers; view aggregation is performed on a plurality of feature maps in each feature map set respectively to obtain an aggregated feature corresponding to each feature map set; and fusion processing is performed on the plurality of obtained aggregated features to obtain a depth image. The plurality of acquired target images are obtained by photographing the target object from different views respectively, so that the plurality of obtained target images include information from different angles of the target object, which enriches information content of the acquired target images. By performing multi-stage convolution processing through the plurality of convolutional layers, a plurality of different feature map sets are obtained, which enriches information content of the feature maps. Fusion processing is performed on the feature maps outputted by the plurality of convolutional layers, which enriches information content included in the obtained depth image, thereby improving the accuracy of the obtained depth image.

In addition, through differences of photographing views between the plurality of target images, view aggregation is performed on the plurality of feature maps in each feature map set, so that fusion processing can be performed subsequently on the feature maps belonging to the same view, and the accuracy of the obtained aggregated features is improved, thereby improving the accuracy of the obtained depth image.

In addition, in the process of performing fusion processing on the feature maps outputted by the plurality of convolutional layers, during fusion of the aggregated features corresponding to the convolutional layers, fusion processing is performed on probability maps corresponding to the aggregated features, so that when the plurality of aggregated features are fused, the impact of a probability on each pixel position is taken into consideration, and the accuracy of an obtained fourth aggregated feature is improved, thereby improving the accuracy of the obtained depth image.

BRIEF DESCRIPTION OF THE DRAWINGS

To describe the technical solutions in the embodiments of the disclosure more clearly, the following briefly introduces the accompanying drawings required for describing the embodiments. The accompanying drawings in the following description show only some embodiments of the disclosure, and a person of ordinary skill in the art may still derive other accompanying drawings from the accompanying drawings without creative efforts. In addition, one of ordinary skill would understand that aspects of example embodiments may be combined together or implemented alone.

FIG. 5 is a flowchart of performing fusion processing on a second feature volume according to an embodiment of the disclosure.

FIG. 6 is a flowchart of a depth image generation method according to an embodiment of the disclosure.

DESCRIPTION OF EMBODIMENTS

To make objectives, technical solutions, and advantages of the embodiments of the disclosure clearer, the following further describes in detail embodiments of the disclosure with reference to the accompanying drawings. The described embodiments are not to be construed as a limitation to the present disclosure. All other embodiments obtained by a person of ordinary skill in the art without creative efforts shall fall within the protection scope of the present disclosure.

The terms "first", "second", and the like used in the disclosure may be used for describing various concepts in this specification. However, the concepts are not limited by the terms unless otherwise specified. The terms are merely used for distinguishing one concept from another concept. For example, without departing from the scope of the disclosure, a first feature image may be referred to as a second feature image, and similarly, the second feature map may be referred to as the first feature map.

For the terms "a plurality of", "each", and "any" used in the disclosure, "a plurality of" refers to "two" or "more", "each" refers to "each of a plurality of corresponding", and "any" refers to "any one of a plurality of". For example, when "a plurality of elements" refers to "three elements", "each" refers to "each of the three elements", and "any" refers to "any one of the three elements", that is, may be the first element, the second element, or the third element.

The depth image generation method provided by the embodiments of the disclosure may be used in a computer device. In a possible embodiment, the computer device is a terminal, and the terminal is a terminal of a variety of types such as a mobile phone, a computer, and a tablet computer. The terminal photographs a target object through a camera to acquire a plurality of target images, performs multi-stage convolution processing on the plurality of target images through a plurality of convolutional layers in a convolution model to obtain feature map sets respectively outputted by the plurality of convolutional layers, performs view aggregation on a plurality of feature maps in each feature map set respectively to obtain an aggregated feature corresponding to each feature map set, and performs fusion processing on the plurality of obtained aggregated features to obtain a depth image.

Figure 1:
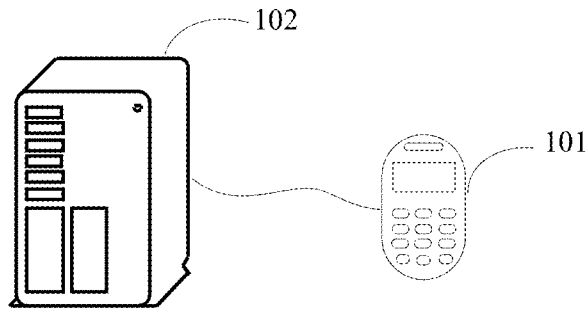
FIG. 1 is a schematic structural diagram of an embodiment environment according to an embodiment of the disclosure.

In another possible embodiment, the computer device includes a server and a terminal. FIG. 1 is a schematic structural diagram of an implementation environment according to an embodiment of the disclosure. As shown in FIG. 1, the implementation environment includes a terminal 101 and a server 102. The terminal 101 establishes a communication connection with the server 102, and performs interaction through the established communication connection. The terminal 101 is a terminal 101 of a variety of types, such as a mobile phone, a computer, and a tablet computer. The server 102 is a server, or a server cluster including a plurality of servers, or a cloud computing service center. The terminal 101 photographs a target object through a camera to acquire a plurality of target images, and transmits the plurality of acquired target images to the server 102. The server 102 performs multi-stage convolution processing on the plurality of target images through a plurality of convolutional layers in a convolution model to obtain feature map sets respectively outputted by the plurality of convolutional layers, performs view aggregation on a plurality of feature maps in each feature map set respectively to obtain an aggregated feature corresponding to each feature map set, and performs fusion processing on the plurality of obtained aggregated features to obtain a depth image. The server 102 can also transmit the depth image to the terminal 101 subsequently.

The method provided in the embodiments of the disclosure may be used in various scenarios of three-dimensional model construction.

For example, in a scenario of building surveying and mapping:

A user photographs a building through a camera of a terminal, and the terminal, by adopting the depth image generation method provided by the embodiments of the disclosure, photographs the building from different views, processes a plurality of acquired target images to obtain a depth image, and processes the depth image to obtain a three-dimensional model of the building, so that the three-dimensional model of the building can be surveyed and mapped subsequently.

In another example, in an indoor layout scenario:

A user photographs the interior of a house through a camera of a terminal, and the terminal, by adopting the depth image generation method provided by the embodiments of the disclosure, photographs the interior of the house from different views, processes a plurality of acquired target images to obtain a depth image, and processes the depth image to obtain a three-dimensional model of the interior of the house. The user can simulate the home layout in the three-dimensional model of the house, so as to realize dynamic display of home design, so that the user can intuitively view a state presented by the home design.

Figure 2:
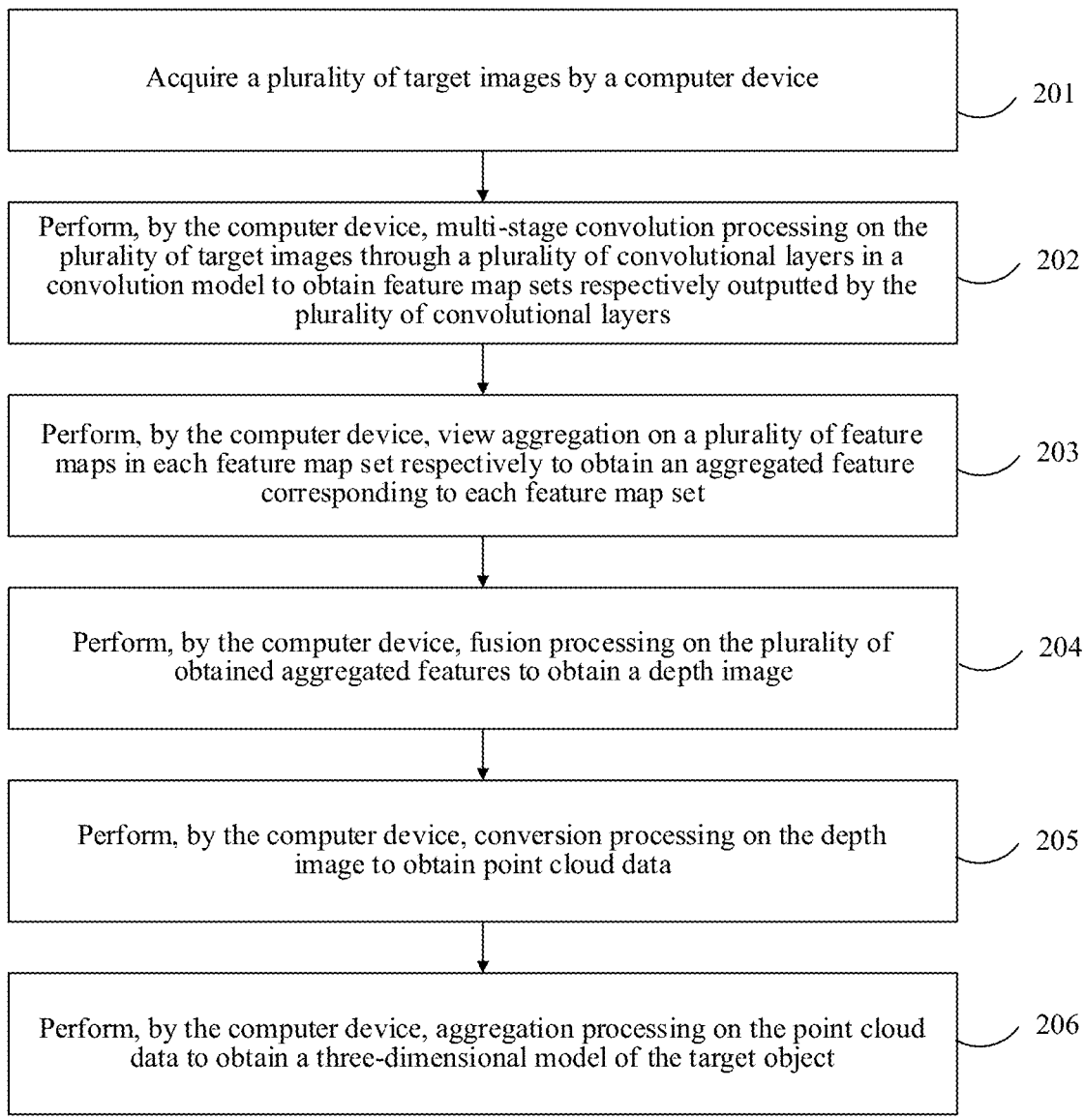
FIG. 2 is a flowchart of a depth image generation method according to an embodiment of the disclosure.

FIG. 2 is a flowchart of a depth image generation method according to an embodiment of the disclosure, which is applied to a computer device. As shown in FIG. 2, the method includes the following operations:

Operation 201: Acquire a plurality of target images by the computer device.

The plurality of target images are obtained respectively by photographing a target object from different views.

In the embodiments of the disclosure, if the same target object is photographed from different views, display states of the target object in the plurality of acquired target images are different, and therefore, a depth image of the target object can be generated by processing the plurality of target images according to differences between the plurality of target images, so that a three-dimensional model of the target object can be acquired through the depth image subsequently.

The view is jointly determined by a photographing parameter of the camera and a relative position between the camera and the target object. The photographing parameter may include a focal length, a pixel, and the like. For example, photographing the object through different photographing parameters while keeping the relative position between the camera and the object unchanged can obtain images from different views. Alternatively, photographing the object at different relative positions while keeping the photographing parameter unchanged can also obtain images from different views. Alternatively, photographing the object at different relative positions through different photographing parameters can also obtain images from different views.

In a plurality of images obtained by photographing from different views, display states of the target object are different, and the display states may include the size of the displayed target object, a display position of the target object in the image, and an angle at which the target object is displayed. For example, the target object is photographed from different views to obtain three images, the target object is displayed in an upper left area of a first image, and a left side image of the target object is displayed; the target object is displayed in a middle area of a second image, and a frontal image of the target object is displayed; the target object is displayed in a lower right area of a third image, and a right side image of the target object is displayed; and the sizes of the target objects displayed in the three images decrease sequentially.

In the plurality of target images, different target images correspond to different views. Therefore, if the same target object is included in different target images, the display states of the target object are different. The plurality of target images may be directly obtained by photographing the target object from different views, or may be obtained after processing images obtained by photographing.

For the acquisition method of the plurality of target images, in a possible embodiment, the target object is photographed from a plurality of different views to obtain a plurality of target images. Alternatively, the target object is photographed from a plurality of different views to obtain a plurality of original images, and scale adjustment is performed on the plurality of original images to obtain a plurality of target images adjusted from the plurality of original images. The plurality of target images are of equal scales.

The performing scale adjustment on the plurality of original images may be reducing the plurality of original images to obtain a plurality of target images of a smaller scale; or enlarging the plurality of original images to obtain a plurality of target images of a larger scale. Since the scales of the plurality of original images obtained by photographing are equal, after the scale adjustment is performed on the plurality of original images, the scales of the plurality of obtained target images are also equal.

Operation 202: Perform, by the computer device, multi-stage convolution processing on the plurality of target images through a plurality of convolutional layers in a convolution model to obtain feature map sets respectively outputted by the plurality of convolutional layers.

The convolution model is configured to obtain feature maps of the images. The convolution model is a two-dimensional convolution network model, which may be a Visual Geometry Group Network (VGG) model, a Restnet (a convolutional network model), and the like. The convolution model includes a plurality of convolutional layers, and each convolutional layer is used for performing convolution processing on an input image and outputting a feature map of the image.

The feature map set includes feature maps corresponding to the plurality of target images, and the feature maps are used for indicating features included in the corresponding target images, such as color features, texture features, shape features, or spatial features. When the computer device performs multi-stage convolution processing on the plurality of target images through the plurality of convolutional layers, each convolutional layer can output a feature map set, and the feature maps included in each feature map set one-to-one correspond to the plurality of target images. The number of feature maps included in each feature map set is equal to the number of the plurality of target images. The plurality of convolutional layers are used for performing convolution processing on the plurality of target images, and therefore, a plurality of feature map sets can be obtained, and the number of the plurality of feature map sets is equal to the number of the plurality of convolutional layers.

In a plurality of convolutional layers, for the same target image, the feature maps outputted by different convolutional layers are different, and the obtained feature map sets are also different. In the convolution model, the plurality of convolutional layers are arranged in a preset order. Except for the first convolutional layer, other convolutional layers each use an output of the previous convolutional layer as an input of the current convolutional layer. Accordingly, in a possible embodiment, operation 202 may include:

Performing, through a first convolutional layer in the convolution model, convolution processing on the plurality of target images to obtain a feature map set outputted by the first convolutional layer; and performing, through a next convolutional layer in the convolution model, convolution processing on each feature map in the feature map set outputted by the previous convolutional layer to obtain a feature map set outputted by the next convolutional layer, until feature map sets outputted respectively by the plurality of convolutional layers are obtained.

For example, the convolution model includes 4 convolutional layers, the plurality of target images are inputted to the first convolutional layer in the convolution model, and convolution process is performed on the plurality of target images through the first convolutional layer to obtain a first feature map set outputted by the first convolutional layer, and the first feature map set includes first feature maps corresponding to the plurality of target images. The first feature map set is inputted to a second convolutional layer, convolution processing is performed on each first feature map in the first feature map set through the second convolutional layer to obtain a second feature map set outputted by the second convolutional layer, and the second feature map set includes second feature maps corresponding to the plurality of target images. The second feature map set is inputted to a third convolutional layer, convolution processing is performed on each second feature map in the second feature map set through the third convolutional layer to obtain a third feature map set outputted by the third convolutional layer, and the third feature map set includes third feature maps corresponding to the plurality of target images. The third feature map set is inputted to a fourth convolutional layer, convolution processing is performed on each third feature map in the third feature map set through the fourth convolutional layer to obtain a fourth feature map set outputted by the fourth convolutional layer, and the fourth feature map set includes fourth feature maps corresponding to the plurality of target images, thereby obtaining the feature map sets outputted by the four convolutional layers respectively.

In addition, for the feature map sets outputted by the plurality of convolutional layers, each feature map may be indicated as $\{F_i^l\}_{i=1}^N$, where i indicates a serial number of the target image, and i is an integer greater than 0 and not greater than N; N indicates the number of the plurality of target images, and N is an integer greater than 1; l is any one of the plurality of convolutional layers, the l is an integer greater than 0 and not greater than L; L indicates the number of a plurality of convolutional layers, and L is an integer greater than 1.

Operation 203: Perform, by the computer device, view aggregation on a plurality of feature maps in each feature map set respectively to obtain an aggregated feature corresponding to each feature map set.

In the embodiments of the disclosure, each feature map set includes a plurality of feature maps, and the plurality of feature maps one-to-one correspond to the plurality of target images. Since different target images correspond to different views, by performing view aggregation on the plurality of feature maps to convert the views of the plurality of feature maps into the same view, and then the plurality of feature maps with the same view are aggregated to obtain an aggregated feature, which can eliminate view differences between different target images. When the aggregated feature corresponding to each feature map set is acquired, a Self-adaptive View Aggregation method is used for converting a plurality of feature maps into feature maps from the same view and then fuse them.

Figure 3:
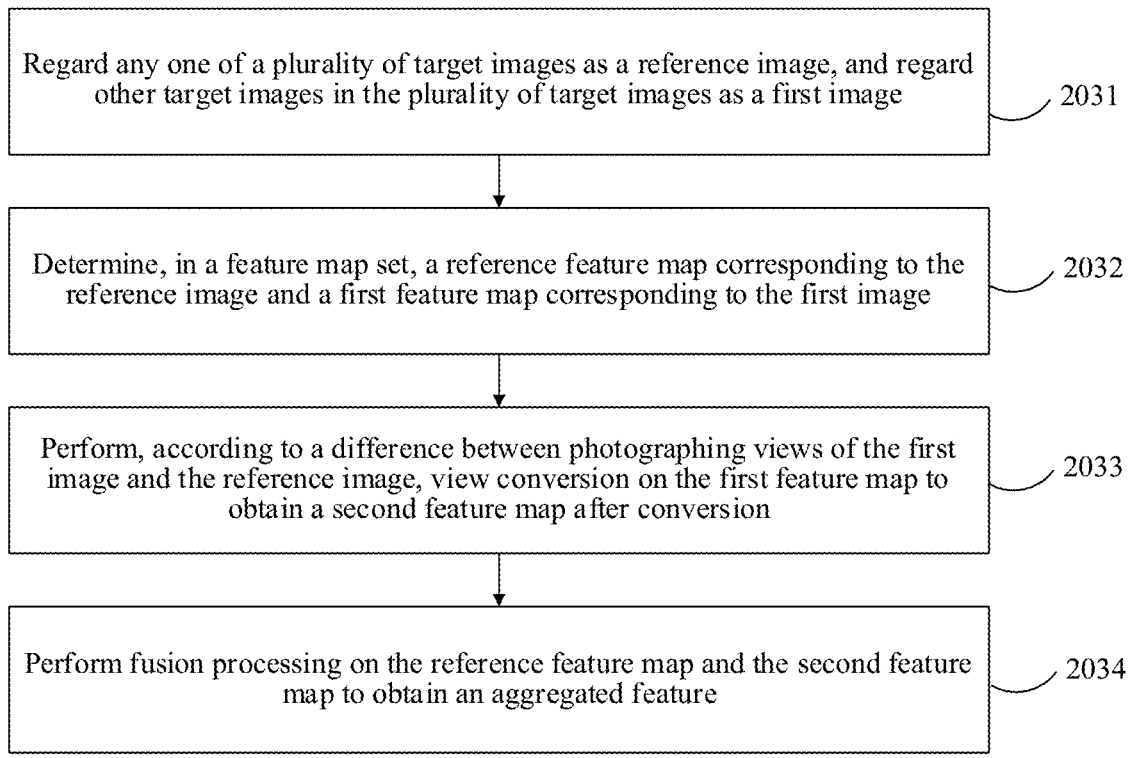
FIG. 3 is a flowchart of a depth image generation method according to an embodiment of the disclosure.

In a possible embodiment, as shown in FIG. 3, operation 203 may include the following operations 2031 to 2034:

Operation 2031: Regard any one of the plurality of target images as a reference image, and regard other target images in the plurality of target images as a first image.

In the embodiments of the disclosure, the reference image may be any one of the plurality of target images. When aggregated features corresponding to a plurality of feature map sets are acquired, for the plurality of feature map sets, the same target image is regarded as a reference image to ensure the consistency of the aggregated features corresponding to the plurality of acquired feature map sets, thereby improving the accuracy of the subsequently obtained depth image.

The number of the first images may be one or more. For example, when the number of the target images is 2, the number of the first images is one; and when the number of the target images is 5, the number of the first images is 4.

2032: Determine, in the feature map set, a reference feature map corresponding to the reference image and a first feature map corresponding to the first image.

The plurality of feature maps in the feature map set one-to-one correspond to the plurality of target images, and therefore, a reference feature map corresponding to the reference image and a first feature map corresponding to the first image can be determined from the plurality of feature maps.

Operation 2033: Perform, according to a difference between photographing views of the first image and the reference image, view conversion on the first feature map to obtain a second feature map.

The view of the image corresponding to the second feature map is the same as the view of the reference image.

The views corresponding to the plurality of target images are different, and therefore, in order to facilitate the subsequent fusion of the plurality of feature maps, it is necessary to convert the first feature map according to the difference between the photographing views of the first image and the reference image, so that the view corresponding to the converted feature map is the same as that of the reference image, thereby eliminating the difference in photographing views of the images.

In a possible embodiment, the feature map set includes a plurality of first feature maps, then for any one of the plurality of first feature maps, view conversion is performed on the first feature map according to the difference between the photographing views of the first image corresponding to the first feature map and the reference image, thereby obtaining the second feature map after conversion. Correspondingly, the view conversion can also be performed in a similar manner for other first feature maps, so that a plurality of second feature maps corresponding to the first feature maps can be obtained.

In a possible embodiment, operation 2033 may include the following operations 1 to 4:

Operation 1: Acquire a first photographing parameter corresponding to the first image and a reference photographing parameter corresponding to the reference image.

The photographing parameter may include a focal length, a pixel, and the like. Different target images correspond to different views, and the view is jointly determined by the photographing parameter of the camera and the relative position between the camera and the target object; therefore, the photographing parameters corresponding to the first image and the reference image are obtained, so that view conversion is performed on the feature images through the photographing parameters.

In addition, the photographing parameter may be acquired when the target object is photographed. For example, when a user photographs a target object through a mobile phone, a sensor of the mobile phone will record a photographing parameter of the target object, and then a plurality of target images and a photographing parameter corresponding to each target image are obtained.

Operation 2: Determine a plurality of depth values corresponding to the convolutional layer that outputs the feature map set.

The depth value is used for indicating a distance between the camera and the target object when the target object is photographed. For example, the plurality of depth values may be 0.1 m, 0.2 m, 0.3 m, 0.4 m, and the like. The plurality of depth values corresponding to the convolutional layers may be preset, or determined according to a depth range and a preset number of depth values. In the plurality of convolutional layers in the convolution model, a plurality of depth values corresponding to different convolutional layers are different. For example, in the plurality of convolutional layers, a plurality of depth values corresponding to a first convolutional layer are 0.1 m, 0.2 m, and 0.3 m; and a plurality of depth values corresponding to a second convolutional layer are 0.1 m, 0.3 m, and 0.5 m.

For the method of determining a plurality of depth values, in a possible embodiment, a depth layer number corresponding to a convolutional layer that outputs the feature map set is determined, and the preset depth range is divided according to the depth layer number to obtain a plurality of depth values. The depth layer number may be preset by a developer, and the depth layer number may be any value, such as 100 and 80. The preset depth range is used for indicating a range of the distance between the target object and the camera when the plurality of target images are obtained by photographing, and may be preset, or predicted based on the plurality of target images. For example, the preset depth range is (0, 1) m, (1, 2) m, or the like.

The preset depth range is divided according to the depth layer number and the preset depth range, and a plurality of depth values are extracted from the preset depth range. The plurality of depth values, differences between any two adjacent depth values may be equal, and the number of the plurality of depth values is equal to a value corresponding to the depth layer number.

For the method of determining the depth layer number, a plurality of convolutional layers may be arranged in a preset order, and an arrangement order L of the convolutional layer that outputs the feature map set is determined, then the arrangement order L and the depth layer number $D^L$ meet the following relationship:

$$D^L = \frac{192}{L+1}$$

$D^L$ indicates the depth layer number of the convolutional layer of an arrangement order L in the plurality of convolutional layers.

For the method of dividing the preset depth range, a maximum depth value and a minimum depth value in the preset depth range may be determined, a difference between the maximum depth value and the minimum depth value is used as a depth span, a value obtained after subtracting 1 from the depth layer number is used as a first value, and a ratio of the depth span to the first value is used as a depth interval. In the preset depth range, starting from the minimum depth value, one depth value is determined at every depth interval, and a plurality of depth values having the quantity equal to the depth layer number are obtained. For example, the preset depth range is [1, 9] m, the depth layer number is 5, the maximum depth value is 9 m, and the minimum depth value is 1 m, then the depth span is 8, and the first value is 4. According to the depth span and the first value, the depth interval is determined to be 2, and starting from the minimum depth value 1, one depth value is determined every depth interval 2, and therefore, 1, 3, 5, 7, 9 in the preset depth range are all determined as the depth values.

Operation 3: Determine, according to a difference between the first photographing parameter and the second photographing parameter as well as the plurality of depth values, a plurality of view conversion matrices corresponding to the plurality of depth values.

A view conversion matrix is configured to perform view conversion on images, which can convert views of images photographed at different angles into the same view. The view conversion matrix may be a HomographyMatrix, or another matrix. Since the view conversion matrix is determined by photographing parameters and depth values of the two images, a plurality of view conversion matrices may be determined according to the first photographing parameter, the second photographing parameter, and the plurality of depth values. In the plurality of view conversion matrices, each view conversion matrix corresponds to a depth value.

Operation 4: Perform, according to the plurality of view conversion matrices, view conversion on the first feature map respectively to obtain a plurality of second feature maps after conversion.

The view corresponding to the second feature map is the same as the view of the reference image. For the first feature map, view conversion is performed by using each view conversion matrix, and then the plurality of second feature maps after conversion can be obtained.

In a possible embodiment, the feature map set includes a plurality of first feature maps, for each first feature map, a plurality of view conversion matrices corresponding to each first feature map are determined, and view conversion is performed for each first feature map respectively according to the plurality of view conversion matrices corresponding to each first feature map, for obtaining a plurality of second feature maps after each first feature map is replaced.

Different target images have different views, and the view is jointly determined by the photographing parameter of the camera and the relative position between the camera and the target object. The plurality of depth values corresponding to different first feature maps are all the plurality of depth values corresponding to the convolutional layers, and the first photographing parameters corresponding to different first feature maps are different. Therefore, the view conversion matrices corresponding to different first feature maps are different. By acquiring a plurality of view conversion matrices corresponding to each first feature map, a plurality of second feature maps converted from each first feature map can be acquired.

For example, the feature map set includes three first feature maps, and the convolutional layer that outputs the feature map set has 20 depth values, then 20 view conversion matrices can be determined for each first feature map. By acquiring 20 view conversion matrices corresponding to each first feature map, 20 second feature maps after conversion corresponding to each first feature map are acquired. Therefore, by performing view conversion on the three first feature maps respectively, 60 second feature maps can be obtained.

In addition, in the embodiments of the disclosure, when the view conversion is performed on the first feature map, a Coarse-To-fine Depth Estimator may be used for processing the first feature map. The Coarse-To-fine Depth Estimator outputs a plurality of second feature maps.

Operation 2034: Perform fusion processing on the reference feature map and the second feature map to obtain the aggregated feature.

The aggregated feature is used for indicating a multi-dimensional feature of the feature map set corresponding to the plurality of target images. If the reference feature map and the second feature map are both one-dimensional feature maps, the reference feature map and the second feature map are fused to obtain a two-dimensional feature map. The photographing view corresponding to the obtained second feature map is the same as the photographing view corresponding to the reference feature map, and therefore, fusion processing may be performed directly on the reference feature map and the second feature map to obtain the aggregated feature.

In a possible embodiment, there are a plurality of first images, and operation 2034 may include the following operations 5 to 7:

Operation 5: Perform fusion processing on a first quantity of reference feature maps to obtain a reference feature volume corresponding to the reference image.

The first quantity is equal to a quantity of the plurality of depth values, and the reference feature volume is used for indicating a multi-dimensional feature corresponding to the reference image.

In the embodiments of the disclosure, a plurality of depth values are determined for the convolutional layer that outputs the feature map set, and during view conversion performed on each first image in the feature map set, a plurality of second feature maps after conversion corresponding to each first image may be acquired. In order to ensure the consistency of the quantity of the reference features and the plurality of second feature maps corresponding to each first feature map, for facilitating the subsequent fusion processing of the reference features and second features, it is necessary to fuse the first quantity of reference features to obtain a reference feature volume.

For the fusion processing method, in a possible embodiment, the reference feature volume is obtained by stacking the first quantity of reference feature maps. Since each reference feature map is a one-dimensional feature map, the first quantity of reference feature maps are stacked to obtain a multi-dimensional reference feature volume.

Operation 6: Perform, for each first image, fusion processing on a plurality of second feature maps converted from the first feature maps corresponding to the first image to obtain first feature volumes, and determine differences between the first feature volumes and the reference feature volume as second feature volumes.

The first feature volume is used for indicating the multi-dimensional feature corresponding to the first image, and the second feature volume is used for indicating a multi-dimensional feature corresponding to the difference between the first image and the reference image.

For any first image, fusion processing is performed on a plurality of second feature maps converted from the first feature map corresponding to the first image to obtain the first feature volume corresponding to the first image. Accordingly, fusion processing is performed on a plurality of second feature maps converted from the first feature maps corresponding to other first images to obtain first feature volumes corresponding to the plurality of first images. In the plurality of first feature volumes, the first feature volumes corresponding to different first images are different.

Both the first feature volume and the reference feature volume belong to multi-dimensional features with the same number of dimensions, and therefore, a difference between each first feature volume and the reference feature volume can be directly determined, thereby obtaining a plurality of second feature volumes. In the plurality of second feature volumes, the second feature volumes corresponding to different first images are different.

For the fusion processing method, in a possible embodiment, for any first image, a plurality of second feature maps corresponding to the first image are stacked to obtain the first feature volume of the first image. Each second feature map is a one-dimensional feature map, the plurality of second feature maps are stacked to obtain a multi-dimensional second feature volume.

Operation 7: Perform fusion processing on the plurality of determined second feature volumes to obtain the aggregated feature.

The aggregated feature is used for indicating the multi-dimensional feature corresponding to the plurality of target images, and the aggregated feature is an aggregated feature corresponding to the convolutional layer that outputs the feature map set. By performing fusion processing on a plurality of second feature volumes, the obtained aggregated feature eliminates the difference between views of the plurality of target images, and the objects photographed from different views are fused, thereby enriching features of the object from a plurality of views, and forming the aggregated feature that can fully express the object.

For the method of performing fusion processing on the plurality of second feature volumes, in a possible embodiment, operation 7 may include: acquiring a weight matrix corresponding to the convolutional layer that outputs the feature map set, and according to the weight matrix, performing weighted fusion processing on the plurality of second feature volumes to obtain the aggregated feature.

The weight matrix includes a weight corresponding to each pixel position in the feature maps outputted by the convolutional layers. Through the weight matrix, a product of each second feature volume and the weight matrix is determined, and a ratio of a sum of products corresponding to the plurality of second feature volumes to the number of the plurality of second feature volumes is used as the aggregated feature, so that when fusion processing is performed on the plurality of second feature volumes, the impact of the weight is incorporated, thereby improving the accuracy of the obtained aggregated feature.

The weight matrix may be obtained by training a Weight-Net (a weight matrix acquisition model), which may be composed of a plurality of convolutional layers and a depth Residual Network (ResNet) block. A second feature volume max_pooling($\|V_{i,d,h,w}'\|_1$) of the maximum scale in the plurality of second feature volumes $V_{i,d,h,w}'$ and an average feature volume avg_pooling($\|V_{i,d,h,w}'\|_1$) of the plurality of second feature volumes $V_{i,d,h,w}'$ are acquired, the second feature volume max_pooling($\|V_{i,d,h,w}'\|_1$) of the maximum scale is connected to the average feature volume avg_pooling($\|V_{i,d,h,w}'\|_1$) to obtain a connection array $f_{h,w}$, and convolution process is performed on connection data through the WeightNet to obtain the weight matrix $U_{h,w}$. Therefore, the second feature volume max_pooling($\|V_{i,d,h,w}'\|_1$) of the maximum scale, the average feature volume avg_pooling ($\|V_{i,d,h,w}'\|_1$), the connection array $f_{h,w}$, and the weight matrix $U_{h,w}$ meet the following relationships:

$$U_{h,w} = \text{WeightNet}(f_{h,w})$$

$$f_{h,w} = \text{CONCAT}[\text{max\_pooling}(\|V_{i,d,h,w}'\|_1), \text{avg\_pooling}(\|V_{i,d,h,w}'\|_1)]$$

i indicates any first image in the plurality of first images, and i is a positive integer greater than 0 and smaller than or equal to N−1. N indicates the number of the plurality of target images, and N is a positive integer greater than or equal to 2; d indicates any depth value in the plurality of depth values, h indicates the height of the feature map in the feature map set; and w indicates the width of the feature map in the feature map set.

According to the content in the above operations 5 to 7, a Pixel-Wise View Aggregation method may be used for performing fusion processing on the reference feature map and the second feature map. That is, in a possible embodiment, the aggregated feature, the reference feature volume, the first feature volume, the second feature volume, and the weight matrix meet the following relationships:

$$V'_{i,d,h,w} = V_{i,d,h,w} - V_{0,d,h,w}$$

$$C_{d,h,w} = \frac{\sum_{i=1}^{N-1}(1 + U_{h,w}) \odot V'_{i,d,h,w}}{N-1}$$

i indicates a serial number of the first image, and i is a positive integer greater than 0 and not greater than N−1; N indicates the number of the plurality of target images, and N is an integer greater than 1; d indicates any depth value in the plurality of depth values, h indicates the height of the feature map in the feature map set, and w indicates the width of the feature map in the feature map set; $V_{i,d,h,w}'$ indicates the second feature volume, $V_{i,d,h,w}$ indicates the first feature volume, $V_{0,d,h,w}$ indicates the reference feature volume, $C_{d,h,w}$ indicates the aggregated feature, and $U_{h,w}$ indicates the weight matrix; and ⊙ is used for indicating an element-wise multiplication.

Figure 4:
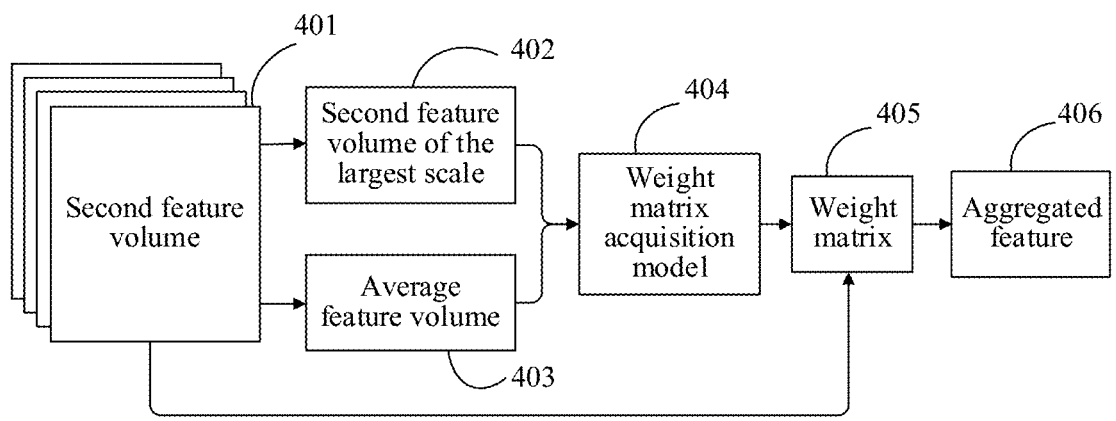
FIG. 4 is a flowchart of performing fusion processing on a second feature volume according to an embodiment of the disclosure.

As shown in FIG. 4, after a plurality of second feature volumes 401 are acquired, a second feature volume 402 with the maximum scale and an average feature volume 403 of the plurality of second feature volumes 401 are determined, a weight matrix 405 is acquired through a weight matrix acquisition model 404, and according to the weight matrix 405, convolution processing is performed on the plurality of second feature volumes 401 to obtain an aggregated feature 406.

According to the content in the above operations 5 to 7, a Voxel-Wise View Aggregation method may be used for performing fusion processing on the reference feature map and the second feature map. That is, in a possible embodiment, the aggregated feature, the reference feature volume, the first feature volume, the second feature volume, and the weight matrix meet the following relationships:

$$V'_{i,d,h,w} = V_{i,d,h,w} - V_{0,d,h,w}$$

$$C_{d,h,w} = \frac{\sum_{i=1}^{N-1}(1 + U_{d,h,w}) \odot V'_{i,d,h,w}}{N-1}$$

i indicates a serial number of the first image, and i is a positive integer greater than 0 and less than or equal to N−1; N indicates the number of the plurality of target images, and N is an integer greater than 1; d indicates any depth value in the plurality of depth values, h indicates the height of the feature map in the feature map set; and w indicates the width of the feature map in the feature map set; $V_{i,d,h,w}'$ indicates the second feature volume, $V_{i,d,h,w}$ indicates the first feature volume, $V_{0,d,h,w}$ indicates the reference feature volume, $C_{d,h,w}$ indicates the aggregated feature, and $U_{d,h,w}$ indicates the weight matrix corresponding to a depth value d; and ⊙ is used for indicating an element-wise multiplication.

As shown in FIG. 5, after a plurality of second feature volumes 501 are acquired, the plurality of second feature volumes 501 are inputted into a weight matrix acquisition model 502 corresponding to the depth value d to obtain a weight matrix 503, and according to the weight matrix 503, convolution processing is performed on the plurality of second feature volumes 501 to obtain an aggregated feature 504.

As described in the embodiments of the disclosure, after feature map sets respectively outputted by a plurality of convolutional layers are acquired, view aggregation is performed directly on a plurality of feature maps in each feature map set. In another embodiment, before operation 203 is performed, it is necessary to sample the feature maps in the acquired feature map sets respectively outputted by the plurality of convolutional layers, so that each feature map is one-dimensional to facilitate subsequent fusion of the feature maps in each feature map set.

Operation 204: Perform, by the computer device, fusion processing on the plurality of obtained aggregated features to obtain a depth image.

The depth image includes the depth value of the target object. The feature maps outputted by each convolutional layer are different, and different feature maps contain different information contents, then different aggregated features in the plurality of aggregated features obtained through the plurality of convolutional layers contain different information. Therefore, performing fusion processing on the plurality of aggregated features enriches the information content of the feature maps, thereby improving the accuracy of the obtained depth image.

Each aggregated feature includes a multi-dimensional feature, and when fusion processing is performed on a plurality of aggregated features, the multi-dimensional features of the aggregated features are fused to obtain a depth image.

Operation 205: Perform, by the computer device, conversion processing on the depth image to obtain point cloud data.

The point cloud data is data composed of a plurality of points in a three-dimensional coordinate system. When conversion processing is performed on the depth image, a point is created in the three-dimensional coordinate system according to a depth value corresponding to any pixel in the depth image, and then a plurality of points can be obtained through depth values of a plurality of pixels in the depth image, thereby forming the point cloud data.

Operation 206: Perform, by the computer device, aggregation processing on the point cloud data to obtain a three-dimensional model of the target object.

Since the points in the point cloud data are in a discrete state, by aggregating the point cloud data, the plurality of points in the point cloud data, thereby obtaining the three-dimensional model of the target object.

In a possible embodiment, operation 206 may include: filtering the point cloud data to obtain filtered point cloud data, and aggregating the filtered point cloud data to obtain a three-dimensional model of the target object.

Due to the impact of noise in the generated point cloud data, by filtering the noise in the point cloud data, the accuracy of the filtered point cloud data is improved, thereby improving the accuracy of the obtained three-dimensional model.

As described in the embodiments of the disclosure, a three-dimensional model is generated, and in another embodiment, it is unnecessary to perform operations 205 to 206, as long as a depth image is obtained.

A depth image generation method is provided in the related art. Through a plurality of convolutional layers in the convolution model, multi-stage convolution processing is performed on images of a photographed object, a feature map outputted by the last convolutional layer is obtained, and convolution processing is performed on the feature map to obtain a depth image of the object. The above method only uses the feature map outputted by the last convolutional layer in the process of acquiring the depth image, the information content of the feature map is small, resulting in a poor accuracy of the depth image.

In the method provided by the embodiments of the disclosure, a plurality of target images are acquired, the plurality of target images being obtained respectively by photographing a target object from different views; multi-stage convolution processing is performed on the plurality of target images through a plurality of convolutional layers in a convolution model to obtain feature map sets respectively outputted by the plurality of convolutional layers; view aggregation is performed on a plurality of feature maps in each feature map set respectively to obtain an aggregated feature corresponding to each feature map set; and fusion processing is performed on the plurality of obtained aggregated features to obtain a depth image. The plurality of acquired target images are obtained by photographing the target object from different views respectively, so that the plurality of obtained target images include information from different angles of the target object, which enriches information content of the acquired target images. By performing multi-stage convolution processing through the plurality of convolutional layers, a plurality of different feature map sets are obtained, which enriches information content of the feature maps. Fusion processing is performed on the feature maps outputted by the plurality of convolutional layers, which enriches information content included in the obtained depth image, thereby improving the accuracy of the obtained depth image.

In addition, through differences of photographing views between the plurality of target images, view aggregation is performed on the plurality of feature maps in each feature map set, so that fusion processing can be performed subsequently on the feature maps belonging to the same view, and the accuracy of the obtained aggregated features is improved, thereby improving the accuracy of the obtained depth image.

In addition, in the process of performing fusion processing on the feature maps outputted by the plurality of convolutional layers, during fusion of the aggregated features corresponding to the convolutional layers, fusion processing is performed on probability maps corresponding to the aggregated features, so that when the plurality of aggregated features are fused, the impact of a probability on each pixel position is taken into consideration, and the accuracy of an obtained fourth aggregated feature is improved, thereby improving the accuracy of the obtained depth image.

On the basis of the above embodiment, in a possible embodiment, referring to FIG. 6, operation 204 may include the following operations 2041 to 2046:

Operation 2041: Regard, by the computer device, an aggregated feature of the maximum scale in the plurality of aggregated features as a first aggregated feature, and regard a plurality of other aggregated features in the plurality of aggregated features as second aggregated features.

In the embodiments of the disclosure, scales of the feature maps outputted by the plurality of convolutional layers in the convolution model decrease sequentially. The aggregated features are obtained by performing fusion processing on the feature maps, and the scales of the aggregated features corresponding to the plurality of convolutional layers decrease successively; therefore, aggregated features of a plurality of scales may be obtained through the plurality of convolutional layers.

The scale of the feature map includes the height of the feature map and the width of the feature map. A larger scale indicates a greater height and width; and a smaller scale indicates a smaller height and width. The dimension of each feature map is 1, the aggregated feature obtained by performing fusion processing on a plurality of feature maps is a multi-dimensional feature. The scale of the aggregated feature includes the height of the feature map, the width of the feature map, and the number of dimensions, where the number of dimensions is equal to the number of feature maps in the feature map set corresponding to the aggregated feature. In a plurality of convolutional layers, the scales of the feature maps outputted by the plurality of convolutional layers decrease sequentially, and therefore, the scales of the plurality of aggregated features corresponding to the plurality of convolutional layers decrease successively.

Operation 2042: Perform, by the computer device, multi-stage convolution processing on the first aggregated feature to obtain a plurality of third aggregated features.

The scales of the plurality of third aggregated features one-to-one correspond to the scales of the plurality of second aggregated features. By performing convolution processing multiple times on the first aggregated feature, the scale of the first aggregated feature is reduced to obtain the plurality of third aggregated features.

In a possible embodiment, multi-stage convolution processing is performed on the first aggregated feature through a plurality of convolutional layers. Convolution processing is performed on the first aggregated feature through a first convolutional layer to obtain a first third aggregated feature, and convolution processing is performed, through a next convolutional layer, on the third aggregated feature outputted by the previous convolutional layer to obtain a third aggregated feature outputted by the next convolutional layer, until the last convolutional layer outputs a last third aggregated feature.

Operation 2043: Perform, by the computer device, fusion processing on the second aggregated feature of the first scale and the third aggregated feature of the first scale, and perform deconvolution processing on the fused feature to obtain a fourth aggregated feature of the second scale.

The first scale is the minimum scale of the plurality of second aggregated features, and the second scale is a previous-level scale of the first scale.

The second aggregated feature and the third aggregated feature are of equal scales, fusion processing is performed on the second aggregated feature of the first scale and the third aggregated feature of the first scale, and the scale of the fused feature obtained is the first scale. Deconvolution processing is performed on the fused feature to increase the scale of the fused feature, thereby obtaining the fourth aggregated feature of the second scale.

Operation 2044: Perform, by the computer device, fusion processing continuously on the currently obtained fourth aggregated feature as well as the second aggregated feature and the third aggregated feature that are of scales equal to that of the fourth aggregated feature, and perform deconvolution processing on the fused feature to obtain a fourth aggregated feature of a previous-level scale, until a fourth aggregated feature of a scale equal to that of the first aggregated feature is obtained. The fused feature and the currently obtained fourth aggregated feature are of equal scales.

When the plurality of third aggregated features, in addition to the third aggregated feature of the first scale, further include a plurality of third aggregated features, operation 2044 is performed multiple times according to ascending order of the scales, and scales of the fourth aggregated features obtained after operation 2044 is performed multiple times increase sequentially, so that the fourth aggregated feature of the maximum scale can be obtained, that is, the fourth aggregated feature of the scale equal to that of the first aggregated feature can be obtained.

For example, if the number of a plurality of third aggregated features is 4, after the fourth aggregated feature of the second scale is obtained through the second aggregated feature of the first scale and the third aggregated feature of the first scale. Fusion processing is performed on the fourth aggregated feature of the second scale, the second aggregated feature of the second scale, and the third aggregated feature of the second scale, and deconvolution processing is performed on the fused feature to obtain a fourth aggregated feature of a third scale. Fusion processing is performed on the fourth aggregated feature of the third scale, the second aggregated feature of the third scale, and the third aggregated feature of the third scale, and deconvolution processing is performed on the fused feature to obtain a fourth aggregated feature of a fourth scale. Fusion processing is performed on the fourth aggregated feature of the fourth scale, the second aggregated feature of the fourth scale, and the third aggregated feature of the fourth scale, and deconvolution processing is performed on the fused feature to obtain a fourth aggregated feature of a fifth scale, the fifth scale being equal to the scale of the first aggregated feature.

In a possible embodiment, operation 2044 may include: performing fusion processing continuously on the currently obtained fourth aggregated feature as well as the second aggregated feature and the third aggregated feature that are of scales equal to that of the fourth aggregated feature, and a probability map of the second aggregated feature, performing deconvolution processing on the fused feature to obtain a fourth aggregated feature of a previous-level scale.

According to ascending order of scales, fusion processing is performed on the second aggregated feature, the third aggregated feature, the fourth aggregated feature that are of the same scale, as well as the probability map corresponding to the second aggregated feature, deconvolution processing is performed on the fused feature, and the above operations are repeated, so that the fourth aggregated feature of the maximum scale can be obtained, the maximum scale being equal to the scale of the first aggregated feature.

The probability map includes a probability corresponding to each pixel position in the second aggregated feature, as a result, when a plurality of fourth aggregated features are acquired, the probability map of the second aggregated feature is integrated, so that the impact of the probability on each pixel position is taken into consideration during the fusion of the plurality of aggregated features, thereby improving the accuracy of the obtained fourth aggregated feature, so that the accuracy of the obtained depth image can be improved subsequently.

Operation 2045: Perform, by the computer device, fusion processing on the currently obtained fourth aggregated feature and the first aggregated feature to obtain a fifth aggregated feature.

The fourth aggregated feature and the first aggregated feature are of equal scales, fusion processing is performed on the fourth aggregated feature and the first aggregated feature so that the fifth aggregated feature after fusion and the first aggregated feature are of equal scales. Moreover, the feature map set outputted by each convolutional layer corresponds to an aggregated feature, the aggregated features corresponding to a plurality of convolutional layers are fused, so that the fifth aggregated feature obtained includes features of the feature maps outputted by the plurality of convolutional layers, which increases the information content included in the fifth aggregated feature, thereby improving the accuracy of the acquired fifth aggregated feature.

Operation 2046: Perform, by the computer device, convolution processing according to the fifth aggregated feature and a probability map corresponding to the first aggregated feature to obtain a depth image.

The probability map is used for indicating the probability corresponding to each pixel position in the first aggregated feature, and each probability is used for indicating the probability that a depth value corresponding to each pixel position is correct. The probability map may be obtained by performing convolution processing on the first aggregated feature using a probability map acquisition model. The probability map acquisition model may include an encoder and a decoder. The encoder encodes the first aggregated feature, and then the decoder performs decoding to obtain the probability map. The probability map acquisition model may be a 3 Dimension Convolutional Neural Network (3D CNN) model, or another neural network model.

The fifth aggregated feature and the first aggregated feature are of equal scales, then each pixel position in the fifth aggregated feature corresponds to each pixel position in the first aggregated feature, and therefore, each pixel position in the fifth aggregated feature one-to-one corresponds to the probability in the probability map. Therefore, convolution processing is performed on the fifth aggregated feature and the probability map to obtain a depth image. By incorporating the corresponding probability into the aggregated feature, the accuracy of the obtained depth image is improved.

For the method of performing convolution processing on the fifth aggregated feature and the probability map, in a possible embodiment, the convolutional layer corresponding to the first aggregated feature corresponds to a plurality of depth values, and the first aggregated feature is formed by performing fusion processing on a plurality of second feature maps and a reference feature map, each second feature map corresponding to a depth value, and therefore, the fifth aggregated feature includes a plurality of feature maps, the number of the plurality of feature maps being equal to the number of the plurality of depth values. Then, operation 2046 may include: determining a depth value corresponding to each feature map in the fifth aggregated feature, determining the probability corresponding to each feature map according to the probability map corresponding to the first aggregated feature, performing weighted processing on the depth values corresponding to the plurality of feature maps and the probabilities corresponding to the plurality of feature maps to obtain a predicted depth, and forming the depth image through the predicted depth.

For the above weighted processing method, the depth value d corresponding to each feature map, the probability P corresponding to each feature map, and the predicted depth E meet the following relationship:

$$E = \sum_{d=d_{min}}^{d_{max}} d \times P(d)$$

where, $d_{min}$ indicates the minimum value in a plurality of depth values; $d_{max}$ indicates the maximum value in the plurality of depth values; and P(d) indicates the probability corresponding to the depth value d.

In the above embodiment, the process of acquiring a depth image through a plurality of target images may be realized through a depth image generation model. By inputting the plurality of target images into the depth image generation model, the depth image generation model processes the plurality of target images to output a depth image. The depth image generation model may be a View Aggregation Multi-view Stereo Network (VA-MVSNet, a network model), or another network model.

When the depth image generation model is trained, a plurality of sample images and corresponding depth images are acquired, the sample images are used as an input of the depth image generation model, the depth image is used as an output of the depth image generation model, and iterative training is performed on the depth image acquisition model.

For example, the depth image acquisition model is trained through a Technical University of Denmark (DTU) dataset, the number of sample images is 3, the resolution of each sample image is 640×512, a preset depth range is 425 mm to 935 mm, and the depth layer number is 192. The depth image generation model uses Adam (an optimization algorithm) with an initial learning rate of 0.1 and an attenuation parameter of 0.9 to train the depth image generation model, and adjusts a weight matrix w and a bias parameter b in the depth image generation model. In each iteration process, the outputted depth image is compared with a real depth image to obtain a prediction result error, and a parameter of the depth image generation model is adjusted according to the prediction result error, so that a sum of loss functions of the depth image generation model may be reduced. When the depth image generation model is trained by using sample images of a plurality of scales, a loss function parameter λ of each scale is {0.32, 0.16, 0.04, 0.01}, the number of the plurality of scales is 4, and the number of Graphics Processing Units (GPUs) in the DTU dataset is also 4.

In addition, in the process of training the depth image generation model, the depth image generation model needs to be tested. For example, during the test, the number of inputted images is 5, the depth layer number is 192, the pyramid layer number is 3, and a downsampling parameter is 0.5. When the depth image generation model is tested on the DTU dataset, the scale of an inputted image is 1600×1184. When the depth image generation model is tested on Tanks and Tempers (a dataset), the scale of an inputted image is 1920×1056.

In the process of training the depth image acquisition model, the depth image acquisition model may be trained according to the sum of the loss functions of the depth image acquisition model, and when the sum of the loss functions reaches a preset threshold, the training of the depth image acquisition model is completed. The sum of the loss functions may be expressed as E, which meets the following relationship:

$$E = \sum_{l=l_1}^{L} \lambda_l \sum_{x \in X_{valid}} \left\| d^l(x) - \hat{d}^l(x) \right\|_1$$

l is any one of the plurality of convolutional layers, the l is an integer greater than 0 and not greater than L; $l_1$ is a first convolutional layer in the plurality of convolutional layers; L is used for indicating the number of the plurality of convolutional layers for acquiring the feature maps; $\lambda_l$ is a loss function parameter corresponding to the convolutional layer l; x indicates each pixel in the depth image, $X_{valid}$ indicates all pixels contained in each depth image; $d^l(x)$ indicates a true depth of the pixel x, and $\hat{d}^l(x)$ indicates a preset depth of the pixel x.

Figure 7:
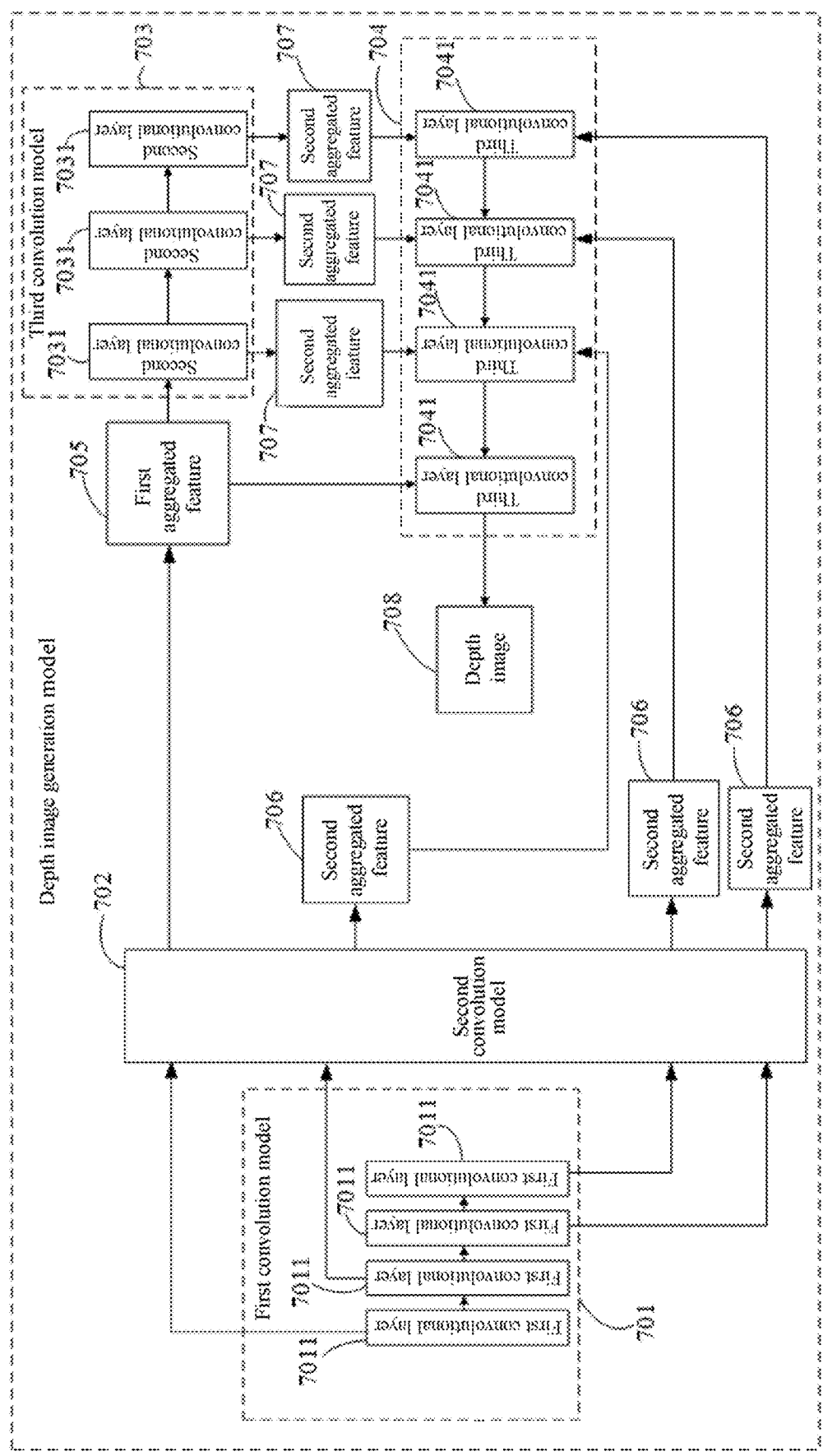
FIG. 7 is a schematic structural diagram of a depth image generation model according to an embodiment of the disclosure.

As shown in FIG. 7, the depth image generation model includes a first convolution model 701, a second convolution model 702, a third convolution model 703, and a fourth convolution model 704. The first convolution model 701 is the same as the convolution model in the above operation 202, and is configured to acquire a feature map of a target image, and input a feature map set outputted by each first convolutional layer 7011 into the second convolution model 702. The second convolution model 702 performs view aggregation on each feature map set, and outputs a first aggregated feature 705 and a second aggregated feature 706. The third convolution model 703 performs multi-stage convolution processing on the first aggregated feature 705 through a plurality of second convolutional layers 7031 to obtain a plurality of third aggregated features 707. The fourth convolution model 704 performs the above operations 2043 to 2046 through a plurality of third convolutional layers 7041, and outputs a depth image 708.

Figure 8:
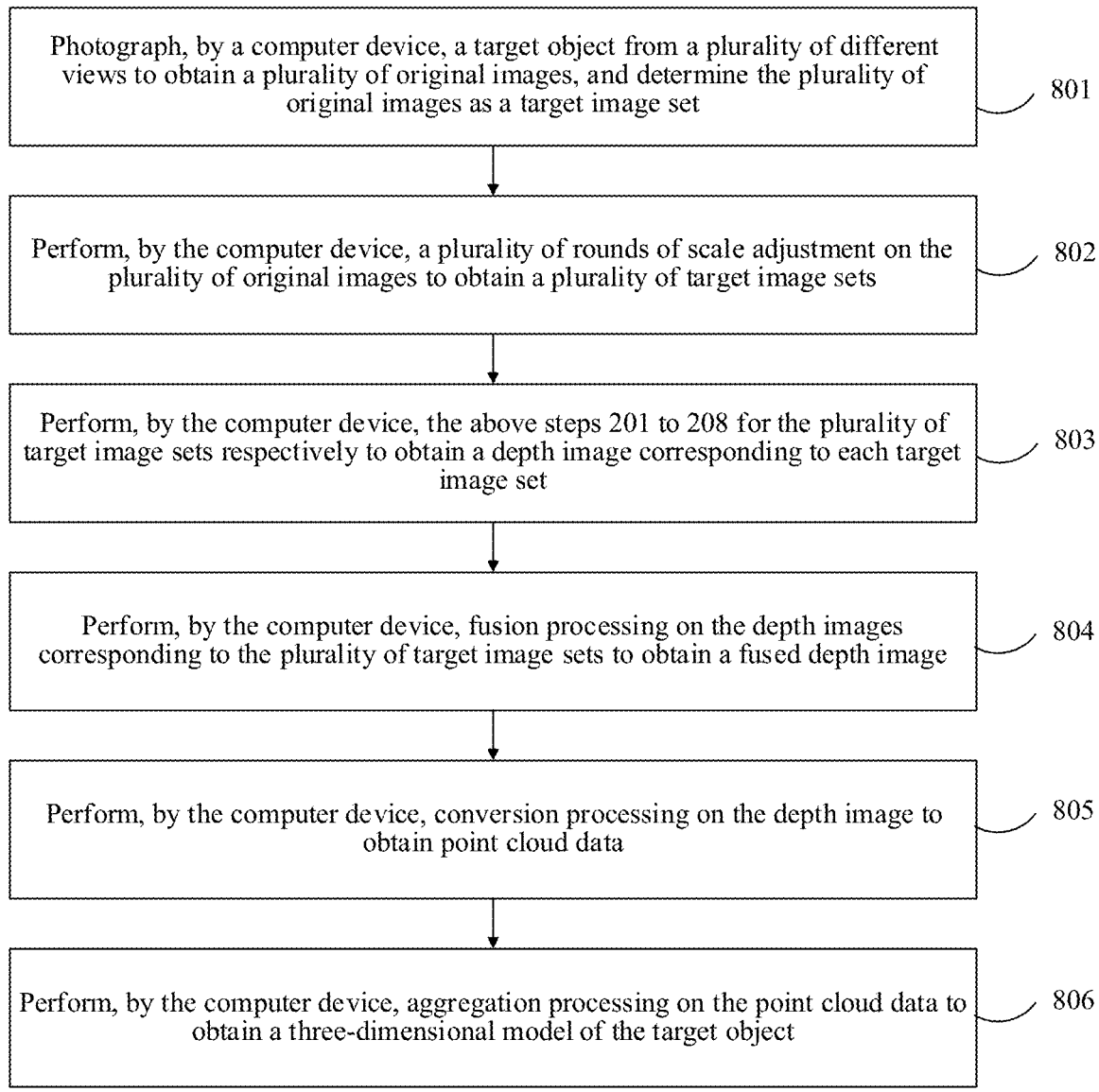
FIG. 8 is a flowchart of a depth image generation method according to an embodiment of the disclosure.

FIG. 8 is a flowchart of a depth image generation method according to an embodiment of the disclosure. As shown in FIG. 8, the method includes the following operations:

Operation 801: Photograph, by a computer device, a target object from a plurality of different views to obtain a plurality of original images, and determine the plurality of original images as a target image set.

This operation is similar to the method of acquiring original images in the above operation 201, and is not repeated here.

Operation 802: Perform, by the computer device, a plurality of rounds of scale adjustment on the plurality of original images to obtain a plurality of target image sets.

Each target image set includes a plurality of target images of the same scale, and target images in different target image sets are of different scales.

The performing scale adjustment on the plurality of original images may be: reducing the plurality of original images to obtain a plurality of target images of a smaller scale; or enlarging the plurality of original images to obtain a plurality of target images of a larger scale. Since the plurality of original images are of equal scales, after each round of scale adjustment is performed on the plurality of original images, the plurality of obtained target images are also of equal scales, and the scales of the target images obtained in different rounds of scale adjustment are different.

For the plurality of rounds of scale adjustment, in a possible embodiment, a first round of scale adjustment is performed on the plurality of original images to obtain a first target image set, and a next round of scale adjustment is performed on a plurality of target images of the target image set obtained in the previous round to obtain a next target image set, until a plurality of target image sets are obtained.

For example, the plurality of rounds include 3 rounds. The first round of scale adjustment is performed on a plurality of original images to obtain a first target image set, the second round of scale adjustment is performed on a plurality of target images in the first target image set to obtain a second target image set, and a third round of scale adjustment is performed on a plurality of target images in the second target image set to obtain a third target image set.

In addition, the plurality of target image sets obtained through operations 801 to 802 can form an image pyramid. In the image pyramid, the scale of the bottommost image is the maximum, and as the level of the image pyramid increases, the scale of the image in the corresponding level decreases. The target image set corresponding to the plurality of original images is the bottommost layer of the image pyramid. The first round of scale adjustment is performed on the plurality of original images to obtain a target image set of an upper layer of the bottommost layer. One round of scale adjustment is performed on the upper-layer target image set to obtain a higher-level target image set, and a plurality of rounds of scale adjustment are repeated to form the image pyramid containing a preset number of layers of target image sets.

Operation 803: Perform, by the computer device, the above operations 201 to 208 for the plurality of target image sets respectively to obtain a depth image corresponding to each target image set.

In the plurality of target image sets, each target image set includes a plurality of target images, the plurality of target images in each target image set are then respectively regarded as the plurality of target images in the above operation 201. The plurality of target images are processed to obtain a depth image corresponding to each target image set, thereby obtaining a plurality of depth images.

The scales of images in different target image sets are different, and therefore, the scales of depth images corresponding to different target image sets are different, that is, for a plurality of target image sets, depth images of a plurality of scales are obtained.

Operation 804: Perform, by the computer device, fusion processing on the depth images corresponding to the plurality of target image sets to obtain a fused depth image.

The scales of the depth images corresponding to the plurality of target image sets are different, depth values contained in the depth images of different scales are different, and a depth image with a larger scale contain more depth values. Therefore, during the fusion processing of the depth images of a plurality of scales, the depth images of a plurality of scales may be fused sequentially according to ascending order of the scales. Fusing the depth images of a plurality of scales enriches the depth value of the fused depth image, thereby improving the accuracy of the fused depth image.

For the method of performing fusion processing on the depth images corresponding to the plurality of target image sets, in a possible embodiment, operation 804 may include: replacing, starting from a depth image of a minimum scale, a depth value of a second pixel corresponding to a first pixel in a depth image of a previous scale with a depth value of the first pixel meeting a preset condition in a current depth image, until a depth value in a depth image of a maximum scale is replaced, for obtaining a depth image after replacing a depth value of a depth image of the maximum scale. The depth image includes a plurality of pixels, and each pixel corresponds to a depth value.

In the depth images of two adjacent scales, a first pixel corresponding to a second pixel indicates that the first pixel and the second pixel have the same corresponding position, and meeting a preset condition indicates that a depth value of the first pixel is more accurate than a depth value of the second pixel. Therefore, the depth value of the first pixel with a high accuracy in the depth image of the smaller scale is used for replacing the depth value of the second pixel in the depth image of the previous scale, so that each pixel in the depth image of the previous scale after the replacement has a more accurate depth value. According to ascending order of the scales of the depth images, the depth value of the second pixel of the previous scale is replaced with the first pixel in the small-scale depth image sequentially. After a plurality of replacements, the depth value of each pixel in the obtained depth image of the maximum scale is more accurate, thereby improving the accuracy of the acquired depth image.

By using the image pyramid of the depth map formed by the acquired depth images corresponding to the plurality of image sets, that is, the obtained depth images of a plurality of scales, the depth images of a plurality of scales are fused through Multi-metric Pyramid Depth Map Aggregation to obtain a fused depth image.

For the method of determining the corresponding pixels in the depth images of adjacent scales, in a possible embodiment, the following operations may be included:

Operation 1: Map, for a first depth image and a second depth image of adjacent scales, any second pixel in the second depth image into the first depth image according to a pixel mapping relationship between the first depth image and the second depth image to obtain a first pixel. A scale of the second depth image is greater than a scale of the first depth image.

The pixel mapping relationship includes corresponding relationships between a plurality of pixels in the first depth image and a plurality of pixels in the second depth image. The first depth image and the second depth image are obtained from a plurality of target images, the scales of the target images corresponding to different depth images are different, and the target images of different scales are all obtained by performing scale adjustment on the original images. Therefore, corresponding relationships between a plurality of pixels in the first depth image and the second depth image can be determined, so that a pixel mapping relationship between the first depth image and the second depth image can be obtained.

The scale of the first depth image is smaller than that of the second depth image, and therefore, when the pixel mapping relationships between the plurality of pixels in the first depth image and the second depth image are determined, the number of pixels included in the first depth image is the same as the number of pixels included in the second depth image, and the size of each first pixel in the first depth image is smaller than the size of each second pixel in the second depth image. The size of the pixels included in the first depth image is equal to the size of the pixels included in the second depth image, and therefore, the number of first pixels in the first depth image is smaller than the number of second pixels in the second depth image, each first pixel corresponding to a plurality of second pixels.

Operation 2: Inversely map the first pixel into the second depth image according to the pixel mapping relationship to obtain a third pixel.

In the embodiments of the disclosure, the process of determining a corresponding pixel in a small-scale depth image through a pixel in a large-scale depth image is a mapping process; and the process of determining a corresponding pixel in a large-scale depth image through a pixel in a small-scale depth image is referred to as an inverse mapping process. The scales of the first depth image and the second depth image are different, it cannot be guaranteed that the pixels in the first depth image one-to-one correspond to the pixels in the second depth image. Therefore, when the second pixel in the second depth image is mapped into the first depth image, the first pixel is obtained, then when the first pixel is inversely mapped into the second depth image, a difference will be generated between the obtained third pixel and the second pixel, so that the obtained third pixel is different from the second pixel.

Operation 3: Determine, in response to a distance between the first pixel and the third pixel being less than a first preset threshold, that the first pixel corresponds to the second pixel.

The first preset threshold may be any preset value, such as 1 and 2. The distance between the first pixel and the third pixel is smaller than the first preset distance, indicating that the image consistency between the first pixel and the second pixel is met, and therefore, it can be determined that the first pixel corresponds to the second pixel.

When a distance between the first pixel and the third pixel is determined, the distance between the first pixel and the third pixel may be determined according to a coordinate value of the first pixel and a coordinate value of the third pixel in the first depth image. When it is determined that the first pixel corresponds to the second pixel, the coordinate value $P_1$ of the first pixel and the coordinate value $P_3$ of the third pixel meet the following relationship:

$$\|P_1 - P_3\|_2 < M$$

where, M is an arbitrary constant, for example, M is 1.

For the method of determining that the first pixel corresponds to the second pixel, in a possible embodiment, operation 3 may include: determining that the first pixel corresponds to the second pixel in response to the distance being less than the first preset threshold and a difference value between depth values corresponding to the first pixel and the third pixel being smaller than a second preset threshold.

The second preset threshold may be any preset value. The distance between the first pixel and the third pixel is smaller than the first preset distance, indicating that image consistency between the first pixel and the second pixel is met. The difference value between the depth values corresponding to the first pixel and the third pixel is less than the second preset threshold, indicating that geometric consistency between the first pixel and the second pixel is met. Therefore, it can be determined that the first pixel corresponds to the second pixel.

In the first depth image and the second depth image, each pixel has a corresponding depth value. When the difference value between the depth values corresponding to the first pixel and the third pixel is smaller than the second preset threshold, the depth value $D(P_1)$ corresponding to the first pixel and the depth value $d_3$ corresponding to the third pixel meet the following relationship:

$$\|D(P_1) - d_3\|_2 < 0.01 \cdot D(P_1)$$

For the method of determining that the first pixel meets the preset condition, in a possible embodiment, it is determined that the first pixel meets the preset condition in response to that the probability corresponding to the depth value of the first pixel is greater than the second preset threshold, and the probability corresponding to the depth value of the second pixel is less than a third preset threshold.

Both the second preset threshold and the third preset threshold may be any preset values, for example, the second preset threshold is 0.9, and the third preset threshold is 0.5. The probability corresponding to the depth value of the first pixel is greater than the second preset threshold, and the probability corresponding to the depth value of the second pixel is less than the third preset threshold, indicating that the depth value of the first pixel is more accurate than the depth value of the second pixel. Therefore, it is determined that the first pixel meets the preset condition, and the depth value of the second pixel may be replaced with the depth value of the first pixel subsequently.

When the first pixel meets the preset condition, the probability $P(P_1)$ corresponding to the depth value of the first pixel and the probability $P(P_2)$ corresponding to the depth value of the second pixel meet the following relationship:

$$P(P_1) > Y, P(P_2) < Z$$

where, Y is the second preset threshold, Z is the third preset threshold, Y and Z are arbitrary constants, and Z is less than Y, for example, Y is 0.9 and Z is 0.5.

In addition, when the probability corresponding to each pixel in the depth image is determined, it can be known from the above operation 2046 that according to a depth value corresponding to each feature map in the fifth aggregated feature and the probability map corresponding to the first aggregated feature, each pixel position in the fifth aggregated feature one-to-one corresponds to the probability in the probability map, and then the probability corresponding to each feature map can be determined, and the probability corresponding to each depth value can be determined. For any pixel in the depth image, according to a predicted depth of the any pixel in the depth image and a plurality of depth values corresponding to the feature maps in the fifth aggregated feature, a preset number of depth values are determined from the plurality of depth values, and a sum of probabilities corresponding to the preset number of depth values is determined as the probability of the pixel in the depth image. The preset number of depth values are a preset number of depth values that are closest to the predicted depth value in the plurality of depth values. The preset number may be any preset value, such as 4 or 5.

For example, for any pixel in the depth image, the preset depth in the depth image is 1, the preset number is 4, and the plurality of depth values are 0.2, 0.4, 0.6, 0.8, 1.2, 1.4, 1.6, and 1.8. Then according to the preset depth 1, it is determined that the preset number of adjacent depth values are 0.6, 0.8, 1.2, and 1.4, and a sum of probabilities corresponding to the preset numbers respectively is regarded as the probability of the pixel in the depth image.

Figure 9:
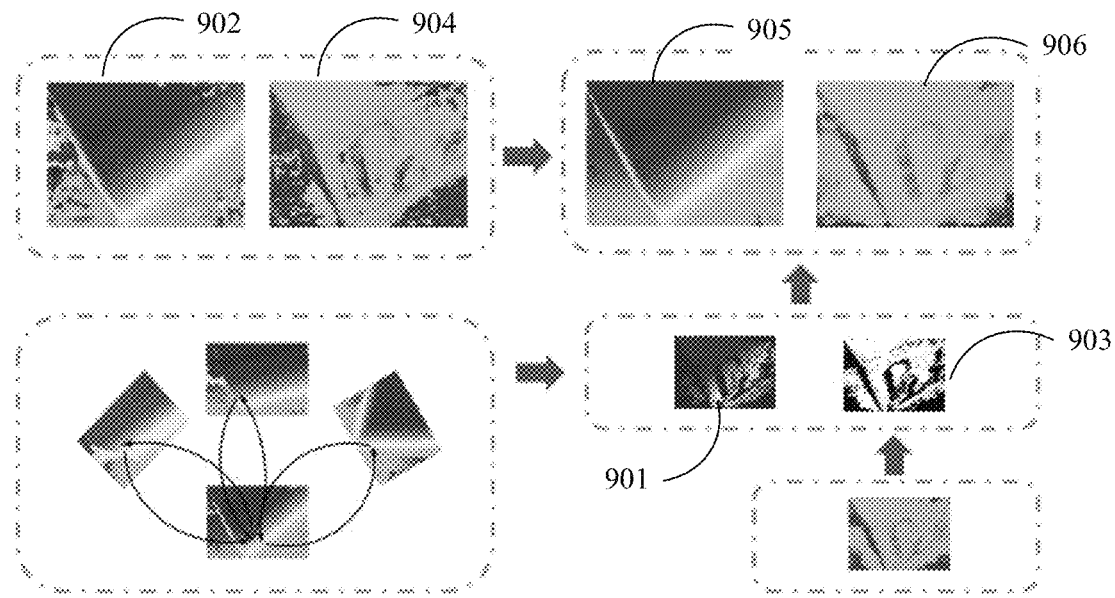
FIG. 9 is a flowchart of fusing a depth image according to an embodiment of the disclosure.

As shown in FIG. 9, for adjacent depth images of two scales, the scale of a first depth image 901 is smaller than the scale of a second depth image 902, and the first depth image 901 is obtained by fusion of depth images of other scales. A first probability map 903 corresponding to the first depth image 901 and a second probability map 904 corresponding to the second depth image 902 are determined. According to the first probability map 903 and the second probability map 904, the first depth image 901 and the second depth image 902 are fused, and a depth value of a first pixel that meets a preset condition in the first depth image 901 is used for replacing a depth value of a second pixel corresponding to the first pixel in the second depth image 902 to obtain a third depth image 905. The third depth image 903 and the second depth image 902 are of equal scales. The probability corresponding to the first pixel in the first probability map 903 is used for replacing the probability corresponding to the second pixel in the second probability image 904, so as to generate a third probability map 906 corresponding to the third depth image 905.

Operation 805: Perform, by the computer device, conversion processing on the depth image to obtain point cloud data.

This operation is similar to the above operation 205, and is not repeated here.

Operation 806: Perform, by the computer device, aggregation processing on the point cloud data to obtain a three-dimensional model of the target object.

This operation is similar to the above operation 206, and is not repeated here.

The embodiments of the disclosure are only described by taking any one of the plurality of target images as a reference image. In another embodiment, each of the plurality of target images is used as a reference image, respectively, and operations 801 to 805 are repeated to obtain a plurality of pieces of point cloud data, then when operation 806 is performed, the plurality of pieces of point cloud data are aggregated to obtain a three-dimensional model of the target object.

In the method provided by the embodiments of the disclosure, a plurality of target images are acquired, the plurality of target images being obtained respectively by photographing a target object from different views; multi-stage convolution processing is performed on the plurality of target images through a plurality of convolutional layers in a convolution model to obtain feature map sets respectively outputted by the plurality of convolutional layers; view aggregation is performed on a plurality of feature maps in each feature map set respectively to obtain an aggregated feature corresponding to each feature map set; and fusion processing is performed on the plurality of obtained aggregated features to obtain a depth image. The plurality of acquired target images are obtained by photographing the target object from different views respectively, so that the plurality of obtained target images include information from different angles of the target object, which enriches information content of the acquired target images. By performing multi-stage convolution processing through the plurality of convolutional layers, a plurality of different feature map sets are obtained, which enriches information content of the feature maps. Fusion processing is performed on the feature maps outputted by the plurality of convolutional layers, which enriches information content included in the obtained depth image, thereby improving the accuracy of the obtained depth image.

Moreover, by performing fusion processing on the depth images of a plurality of scales, the depth value with a high accuracy in the low-scale depth image is used for replacement in the high-scale depth image, which improves the accuracy of the depth image, thereby improving the accuracy of the acquired three-dimensional model.

In addition, each target image in the plurality of target images is used as a reference image, and a plurality of pieces of point cloud data are obtained, and the plurality of pieces of point cloud data are aggregated, which enriches the information contained in the point cloud data, thereby improving the accuracy of the acquired three-dimensional model.

Figure 10:
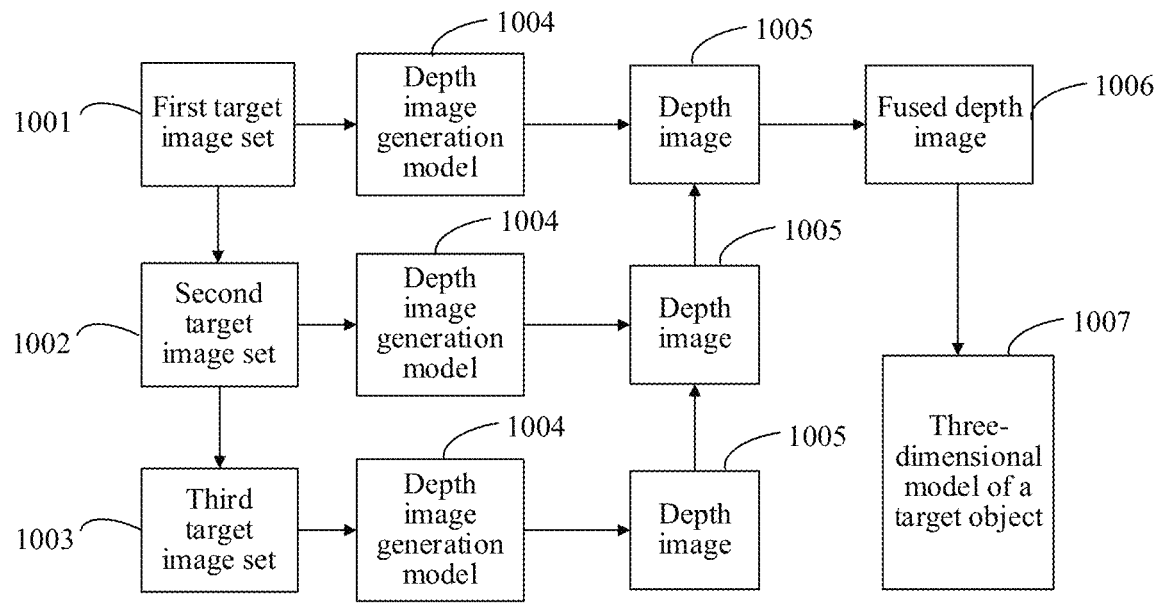
FIG. 10 is a flowchart of generating a three-dimensional model according to an embodiment of the disclosure.

As shown in FIG. 10, a plurality of original images are acquired, the plurality of original images are determined as a first target image set 1001. Two rounds of scale adjustment are performed on the first target image set to obtain a second target image set 1002 and a third target image set 1003, respectively. Each target image set is inputted to a depth image generation model 1004 to obtain depth images 1005 of a plurality of scales. The plurality of depth images are fused to obtain a fused depth image 1006. A conversion processing is performed on the fused depth image 1006 to obtain point cloud data, and aggregation processing is performed on the obtained point cloud data to obtain a three-dimensional model 1007 of a target object.

Operations 801 to 804 in the embodiments of the disclosure may be implemented by a network model. By inputting a plurality of original images into the network model, the network model processes the plurality of original images to obtain a plurality of target image sets, a depth image corresponding to each target image set is acquired, a plurality of depth images are fused, and the fused depth image is outputted. The network model may be a Pyramid View Aggregation Multi-view Stereo Network (PVA-MVSNet) model, or another network model.

Figure 11:
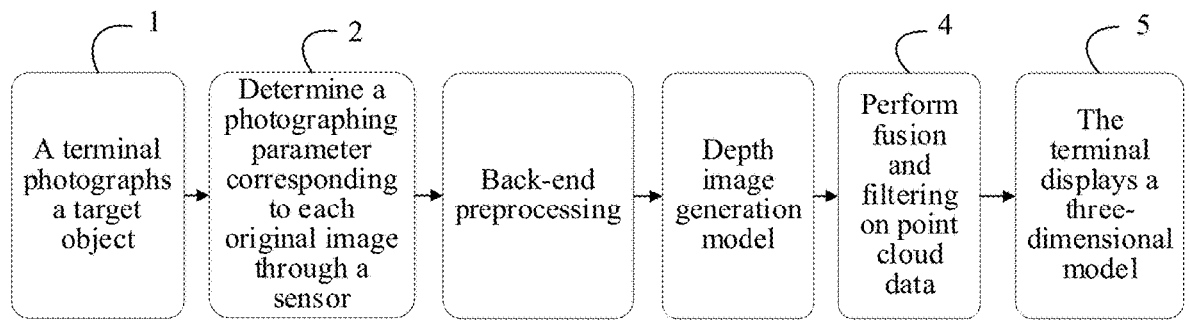
FIG. 11 is a flowchart of generating a three-dimensional model according to an embodiment of the disclosure.

FIG. 11 is a flowchart of generating a three-dimensional model according to an embodiment of the disclosure. As shown in FIG. 11, the method includes the following operations:

1. A user photographs a target object from different views through a camera of a terminal to obtain a plurality of original images.

2. The terminal determines a photographing parameter corresponding to each original image through a sensor.

3. The terminal inputs the plurality of original images and corresponding photographing parameters into a depth image generation model, and the depth image generation model outputs depth images of the target object.

4. The terminal converts the depth images into point cloud data, performs filtering processing on the point cloud data, and fuses the filtered point cloud data to obtain a three-dimensional model of the target object.

5. The terminal displays the three-dimensional model of the target object.

Figure 12:
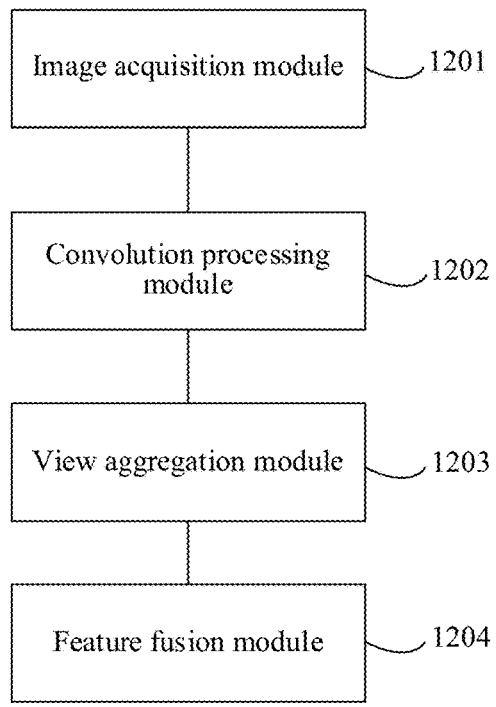
FIG. 12 is a schematic structural diagram of a depth image generation apparatus according to an embodiment of the disclosure.

FIG. 12 is a schematic structural diagram of a depth image generation apparatus according to an embodiment of the disclosure. As shown in FIG. 12, the apparatus includes:

an image acquisition module 1201 configured to acquire a plurality of target images, the plurality of target images being obtained respectively by photographing a target object from different views;

a convolution processing module 1202 configured to perform multi-stage convolution processing on the plurality of target images through a plurality of convolutional layers in a convolution model to obtain feature map sets respectively outputted by the plurality of convolutional layers;

a view aggregation module 1203 configured to perform view aggregation on a plurality of feature maps in each feature map set respectively to obtain an aggregated feature corresponding to each feature map set; and a feature fusion module 1204 configured to perform fusion processing on the plurality of obtained aggregated features to obtain a depth image.

In the apparatus provided by the embodiments of the disclosure, a plurality of target images are acquired, the plurality of target images being obtained respectively by photographing a target object from different views; multi-stage convolution processing is performed on the plurality of target images through a plurality of convolutional layers in a convolution model to obtain feature map sets respectively outputted by the plurality of convolutional layers; view aggregation is performed on a plurality of feature maps in each feature map set respectively to obtain an aggregated feature corresponding to each feature map set; and fusion processing is performed on the plurality of obtained aggregated features to obtain a depth image. The plurality of acquired target images are obtained by photographing the target object from different views respectively, so that the plurality of obtained target images include information from different angles of the target object, which enriches information content of the acquired target images. By performing multi-stage convolution processing through the plurality of convolutional layers, a plurality of different feature map sets are obtained, which enriches information content of the feature maps. Fusion processing is performed on the feature maps outputted by the plurality of convolutional layers, which enriches information content included in the obtained depth image, thereby improving the accuracy of the obtained depth image.

Figure 13:
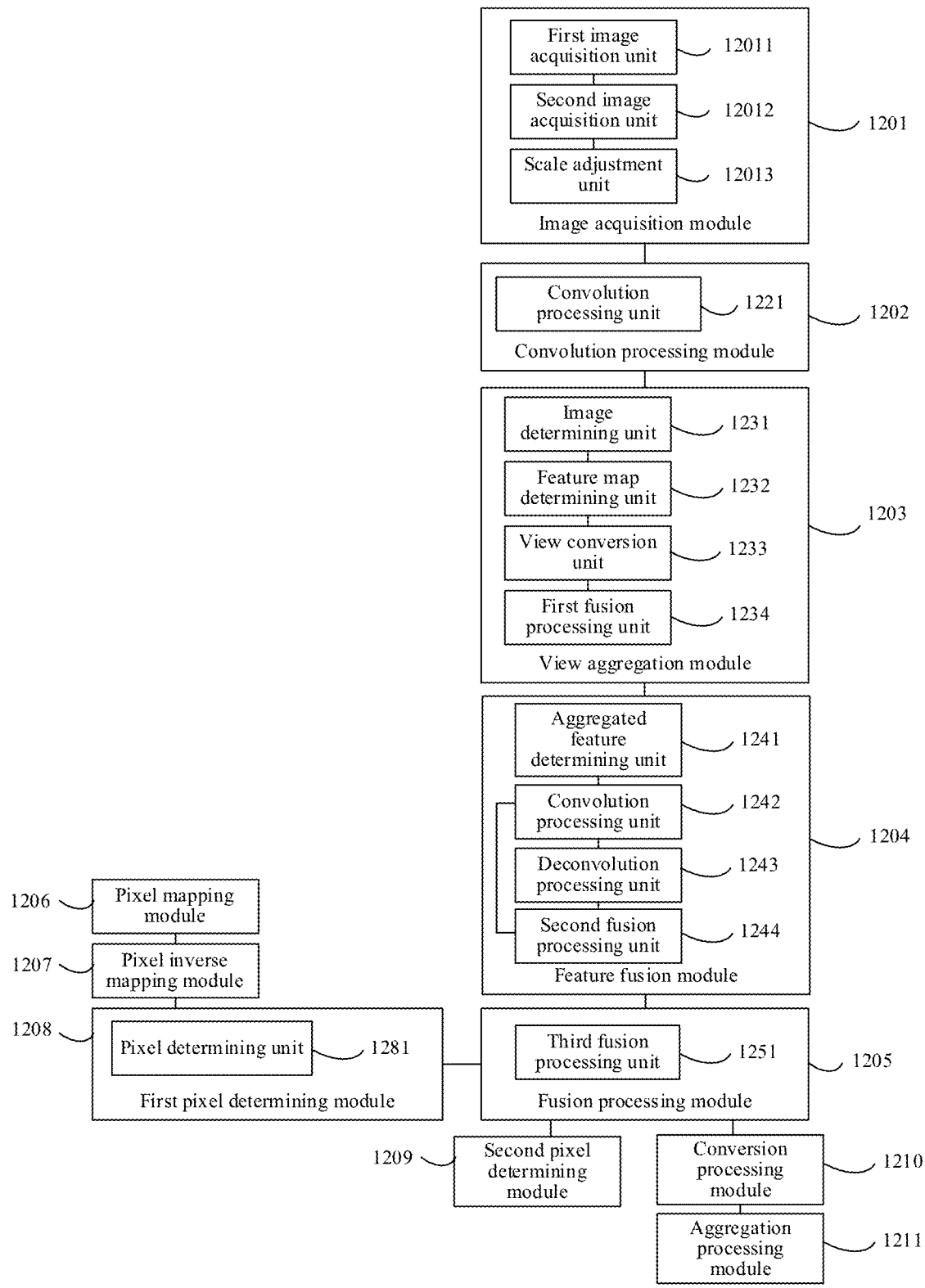
FIG. 13 is a schematic structural diagram of a depth image generation apparatus according to an embodiment of the disclosure.

As shown in FIG. 13, the convolution processing module 1202 may include:

a convolution processing unit 1221 configured to perform convolution processing on the plurality of target images through a first convolutional layer in the convolution model to obtain a feature map set outputted by the first convolutional layer, the feature map set including feature maps corresponding to the plurality of target images.

The convolution processing unit 1221 is further configured to perform, through a next convolutional layer in the convolution model, convolution processing on each feature map in the feature map set outputted by the previous convolutional layer to obtain a feature map set outputted by the next convolutional layer, until feature map sets outputted respectively by the plurality of convolutional layers are obtained.

As shown in FIG. 13, the view aggregation module 1203 may include:

an image determining unit 1231 configured to regard any one of the target images as a reference image, and regard other target images in the plurality of target images as a first image; and perform the following processing on any feature map set:

a feature map determining unit 1232 configured to determine, in the feature map set, a reference feature map corresponding to the reference image and a first feature map corresponding to the first image;

a view conversion unit 1233 configured to perform, according to a difference between photographing views of the first image and the reference image, view conversion on the first feature map to obtain a second feature map after conversion; and a first fusion processing unit 1234 configured to perform fusion processing on the reference feature map and the second feature map to obtain the aggregated feature.

The view conversion unit 1233 may be further configured to acquire a first photographing parameter corresponding to the first image and a reference photographing parameter corresponding to the reference image; determine a plurality of depth values corresponding to the convolutional layer that outputs the feature map set; determine, according to a difference between the first photographing parameter and the second photographing parameter as well as the plurality of depth values, a plurality of view conversion matrices corresponding to the plurality of depth values; and perform, according to the plurality of view conversion matrices, view conversion on the first feature map respectively to obtain a plurality of second feature maps after conversion.

The view conversion unit 1233 may be further configured to determine a depth layer number corresponding to the convolutional layer that outputs the feature map set; and divide a preset depth range according to the depth layer number to obtain the plurality of depth values.

The view conversion unit 1233 may be further configured to perform fusion processing on a first quantity of reference feature maps to obtain a reference feature volume corresponding to the reference image, the first quantity being equal to the quantity of the plurality of depth values; perform, for each first image, fusion processing on the plurality of second feature maps converted from the first feature map corresponding to the first image to obtain first feature volumes, and determine differences between the first feature volumes and the reference feature volume as second feature volumes; and fuse the plurality of determined second feature volumes to obtain the aggregated feature.

The view conversion unit 1233 may be further configured to acquire a weight matrix corresponding to the convolutional layer that outputs the feature map set, the weight matrix including a weight corresponding to each pixel position in the feature map outputted by the convolutional layer; and perform weighted fusion processing on the plurality of second feature volumes according to the weight matrix to obtain the aggregated feature.

The aggregated feature, the reference feature volume, the first feature volume, the second feature volume, and the weight matrix may meet the following relationships:

$$V'_{i,d,h,w} = V_{i,d,h,w} - V_{0,d,h,w}$$

$$C_{d,h,w} = \frac{\sum_{i=1}^{N-1}(1 + U_{d,h,w}) \odot V'_{i,d,h,w}}{N - 1}$$

i indicates a serial number of the first image, and i is a positive integer greater than 0 and not greater than N−1; N indicates the number of the plurality of target images, and N is an integer greater than 1; d indicates any depth value in the plurality of depth values, h indicates the height of the feature map in the feature map set, and w indicates the width of the feature map in the feature map set; $V_{i,d,h,w}'$ indicates the second feature volume, $V_{i,d,h,w}$ indicates the first feature volume, $V_{0,d,h,w}$ indicates the reference feature volume, $C_{d,h,w}$ indicates the aggregated feature, and $U_{h,w}$ indicates the weight matrix; and $\odot$ is used for indicating an element-wise multiplication.

The aggregated feature, the reference feature volume, the first feature volume, the second feature volume, and the weight matrix may meet the following relationships:

$$V'_{i,d,h,w} = V_{i,d,h,w} - V_{0,d,h,w}$$

$$C_{d,h,w} = \frac{\sum_{i=1}^{N-1}(1 + U_{d,h,w}) \odot V'_{i,d,h,w}}{N - 1}$$

i indicates a serial number of the first image, and i is a positive integer greater than 0 and less than or equal to N−1; N indicates the number of the plurality of target images, and N is an integer greater than 1; d indicates any depth value in the plurality of depth values, h indicates the height of the feature map in the feature map set; and w indicates the width of the feature map in the feature map set; $V_{i,d,h,w}'$ indicates the second feature volume, $V_{i,d,h,w}$ indicates the first feature volume, $V_{0,d,h,w}$ indicates the reference feature volume, $C_{d,h,w}$ indicates the aggregated feature, and $U_{d,h,w}$ indicates the weight matrix corresponding to a depth value d; and $\odot$ is used for indicating an element-wise multiplication.

Scales of the feature maps outputted by the plurality of convolutional layers may decrease sequentially. As shown in FIG. 13, the feature fusion module 1204 includes:

an aggregated feature determining unit 1241 configured to regard an aggregated feature of the maximum scale in the plurality of aggregated features as a first aggregated feature, and regard a plurality of other aggregated features in the plurality of aggregated features as second aggregated features;

a convolution processing unit 1242 configured to perform multi-stage convolution processing on the first aggregated feature to obtain a plurality of third aggregated features, scales of the plurality of third aggregated features one-to-one corresponding to scales of the plurality of second aggregated features;

a deconvolution processing unit 1243 configured to perform fusion processing on a second aggregated feature of a first scale and a third aggregated feature of the first scale, and perform deconvolution processing on the fused feature to obtain a fourth aggregated feature of a second scale, the first scale being a minimum scale of the plurality of second aggregated features, and the second scale being a previous-level scale of the first scale;

the deconvolution processing unit 1243 being further configured to perform fusion processing continuously on the currently obtained fourth aggregated feature as well as the second aggregated feature and the third aggregated feature that are of scales equal to that of the fourth aggregated feature, and perform deconvolution processing on the fused feature to obtain a fourth aggregated feature of a previous-level scale, until a fourth aggregated feature of a scale equal to that of the first aggregated feature is obtained; and a second fusion processing unit 1244 configured to perform fusion processing on the fourth aggregated feature of the scale equal to the scale of the first aggregated feature and the first aggregated feature to obtain a fifth aggregated feature; and the convolution processing unit 1242 being further configured to perform, according to a probability map corresponding to the first aggregated feature, convolution processing on the fifth aggregated feature to obtain the depth image.

The deconvolution processing unit 1243 may be further configured to continuously perform fusion processing on the currently obtained fourth aggregated feature as well as the second aggregated feature and the third aggregated feature that are of scales equal to that of the fourth aggregated feature, and a probability map of the second aggregated feature, and perform deconvolution processing on the fused feature to obtain a fourth aggregated feature of a previous-level scale.

As shown in FIG. 13, the image acquisition module 1201 may include:

a first image acquisition unit 12011 configured to photograph the target object from a plurality of different views to obtain a plurality of target images; or, a second image acquisition unit 12012 configured to photograph the target object from a plurality of different views to obtain a plurality of original images; and a scale adjustment unit 12013 configured to perform scale adjustment on the plurality of original images to obtain a plurality of target, the plurality of target images are of equal scales.

The scale adjustment unit 12013 may be further configured to perform a plurality of rounds of scale adjustment on the plurality of original images to obtain a plurality of target image sets, each target image set including a plurality of target images of the same scale, and target images in different target image sets being of different scales; and the apparatus further includes a fusion processing module 1205 configured to perform fusion processing on depth images corresponding to the plurality of target image sets to obtain a fused depth image.

As shown in FIG. 13, the fusion processing module 1205 may include:

a third fusion processing unit 1251 configured to replace, starting from a depth image of a minimum scale, a depth value of a second pixel corresponding to a first pixel in a depth image of a previous scale with a depth value of the first pixel meeting a preset condition in a current depth image, until a depth value in a depth image of a maximum scale is replaced, for obtaining a depth image after replacing the depth value of the depth image of the maximum scale.

As shown in FIG. 13, the apparatus may include:

a pixel mapping module 1206 configured to map, for a first depth image and a second depth image of adjacent scales, any second pixel in the second depth image into the first depth image according to a pixel mapping relationship between the first depth image and the second depth image to obtain a first pixel, a scale of the second depth image being greater than a scale of the first depth image;

a pixel inverse mapping module 1207 configured to inversely map the first pixel into the second depth image according to the pixel mapping relationship to obtain a third pixel; and a first pixel determining module 1208 configured to determine, in response to a distance between the first pixel and the third pixel being less than a first preset threshold, that the first pixel corresponds to the second pixel.

As shown in FIG. 13, the first pixel determining module 1208 may include:

a pixel determining unit 1281 configured to determine that the first pixel corresponds to the second pixel in response to that the distance is less than the first preset threshold and a difference value between the depth values corresponding to the first pixel and the third pixel is smaller than a second preset threshold.

As shown in FIG. 13, the apparatus may include:

a second pixel determining module 1209 configured to determine that the first pixel meets the preset condition in response to that the probability corresponding to the depth value of the first pixel is greater than the second preset threshold, and the probability corresponding to the depth value of the second pixel is less than a third preset threshold.

As shown in FIG. 13, the apparatus may further includes:

a conversion processing module 1210 configured to perform conversion processing on the depth image to obtain point cloud data; and an aggregation processing module 1211 configured to perform aggregation processing on the point cloud data to obtain a three-dimensional model of the target object.

Figure 14:
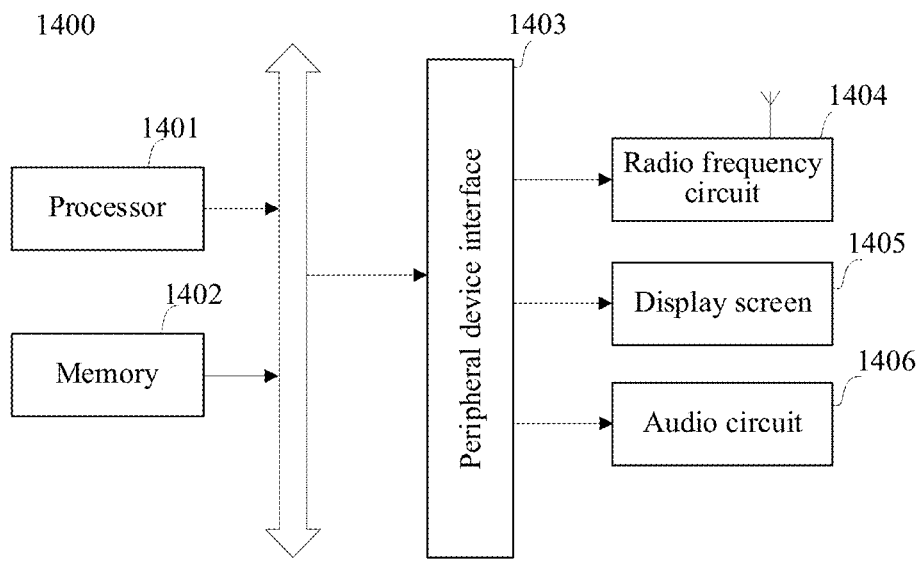
FIG. 14 is a schematic structural diagram of a terminal according to an embodiment of the disclosure.

FIG. 14 is a schematic structural diagram of a terminal according to an embodiment of the disclosure, which can implement operations performed by the first terminal, the second terminal, and the third terminal in the above embodiments. The terminal 1400 may be a portable mobile terminal, for example: a smartphone, a tablet computer, a Moving Picture Experts Group Audio Layer III (MP3) player, a Moving Picture Experts Group Audio Layer IV (MP4) player, a notebook computer, a desktop computer, a head-mounted device, a smart TV, a smart digital speaker, a smart remote controller, a smart microphone, or any another smart terminal. The terminal 1400 may also be referred to as user equipment, a portable terminal, a laptop terminal, a desktop terminal, or another name.

Generally, the terminal 1400 includes a processor 1401 and a memory 1402.

The processor 1401 may include one or more processing cores. For example, the processor may be a 4-core processor or an 8-core processor. The memory 1402 may include one or more computer-readable storage media, which may be non-transitory and configured to store at least one instruction, and the at least one instruction is possessed by the processor 1401 to implement the depth image generation method provided in the method embodiment of the disclosure.

In some embodiments, the terminal 1400 may include a peripheral device interface 1403 and at least one peripheral device. The processor 1401, the memory 1402, and the peripheral device interface 1403 may be connected by a bus or a signal line. Each peripheral device may be connected to the peripheral device interface 1403 by using a bus, a signal cable, or a circuit board. Specifically, the peripheral device includes at least one of a radio frequency (RF) circuit 1404, a display screen 1405, or an audio circuit 1406.

The RF circuit 1404 is configured to receive and transmit an RF signal, which is also referred to as an electromagnetic signal. The RF circuit 1404 communicates with a communication network and another communication device by using the electromagnetic signal.

The display screen 1405 is configured to display a user interface (UI). The UI may include a graphic, text, an icon, a video, and any combination thereof. The display screen 1405 may be a touchscreen display and may also be configured to provide virtual buttons and/or a virtual keyboard.

The audio circuit 1406 may include a microphone and a loudspeaker. The microphone is configured to collect audio signals of a user and an environment, and convert the audio signals into electrical signals to input to the processor 1401 for processing, or input to the RF circuit 1404 for implementing speech communication. For the purpose of stereo acquisition or noise reduction, there may be a plurality of microphones, respectively disposed at different portions of the terminal 1400. The microphone may further be an array microphone or an omni-directional acquisition type microphone. The loudspeaker is configured to convert electric signals from the processor 1401 or the RF circuit 1404 into audio signals.

A person skilled in the art may understand that the structure shown in FIG. 14 does not constitute a limitation to the terminal 1400, and the terminal may include more or fewer components than those shown in the figure, or some components may be combined, or a different component arrangement may be used.

Figure 15:
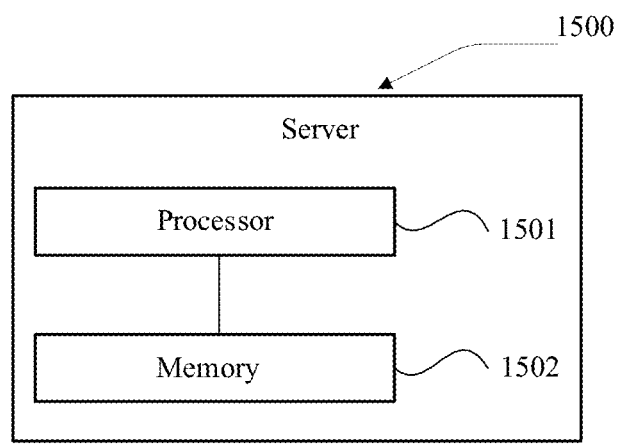
FIG. 15 is a schematic structural diagram of a server according to an embodiment of the disclosure.

FIG. 15 is a schematic structural diagram of a server according to an embodiment of the disclosure. The server 1500 may vary greatly due to different configurations or performance, and may include one or more processors (such as CPUs) 1501 and one or more memories 1502. The memory 1502 stores at least one instruction, the at least one instruction being loaded and executed by the processor 1501 to implement the methods provided in the foregoing method embodiments. Certainly, the device can also have a wired or wireless network interface, a keyboard, an input/output (I/O) interface and other components to facilitate I/O. The device can also include other components for implementing device functions. Details are not described herein again.

The server 1500 may be configured to perform the above depth image generation method.

A computer device is further provided in the embodiments of the disclosure. The computer device includes a processor and a memory, the memory stores at least one piece of program code, and the at least one piece of program code is loaded and executed by a processor to implement the depth image generation method in the above embodiments.

A computer-readable storage medium is further provided in the embodiments of the disclosure. At least one piece of program code is stored in the computer-readable storage medium, and the at least one piece of program code is loaded and executed by a processor to implement the depth image generation method in the above embodiments.

A computer program is further provided in the embodiments of the disclosure. At least one piece of program code is stored in the computer program, and the at least one piece of program code is loaded and executed by a processor to implement the depth image generation method in the above embodiments.

A person of ordinary skill in the art may understand that all or some of the operations of the foregoing embodiments may be implemented by hardware, or may be implemented by a program instructing related hardware. The program may be stored in a computer-readable storage medium. The storage medium may be a ROM, a magnetic disk, or an optical disc.

The foregoing descriptions are merely optional embodiments of the embodiments of the disclosure, but are not intended to limit the embodiments of the disclosure. Any modification, equivalent replacement, or improvement made within the spirit and principle of the embodiments of the disclosure shall fall within the protection scope of the disclosure.

What is claimed is:

1. A depth image generation method, performed by a computer device, comprising:

acquiring a plurality of target images;

performing multi-stage convolution processing on the plurality of target images through a plurality of convolutional layers in a convolution model to obtain feature map sets respectively outputted by the plurality of convolutional layers, each feature map set comprising feature maps corresponding to the plurality of target images;

performing view aggregation on a plurality of feature maps in each feature map set respectively to obtain an aggregated feature corresponding to each feature map set; and performing fusion processing on the plurality of obtained aggregated features to obtain a depth image, wherein the performing view aggregation on a plurality of feature maps in each feature map set respectively to obtain an aggregated feature corresponding to each feature map set comprises:

regarding any one of the target images as a reference image, and regarding other target images in the plurality of target images as a first image;

performing the following processing on a feature map set:

determining, in the feature map set, a reference feature map corresponding to the reference image and a first feature map corresponding to the first image;

performing, according to a difference between photographing views of the first image and the reference image, view conversion on the first feature map to obtain a second feature map after conversion; and performing fusion processing on the reference feature map and the second feature map to obtain the aggregated feature.

2. The depth image generation method according to claim 1, wherein the performing multi-stage convolution processing on the plurality of target images through a plurality of convolutional layers in a convolution model to obtain feature map sets respectively outputted by the plurality of convolutional layers comprises:

performing convolution processing on the plurality of target images through a first convolutional layer in first block convolution model to obtain a feature map set outputted by the first convolutional layer; and performing, through a next convolutional layer in the convolution model, convolution processing on each feature map in the feature map set outputted by the previous convolutional layer to obtain a feature map set outputted by the next convolutional layer, until feature map sets outputted respectively by the plurality of convolutional layers are obtained.

3. The depth image generation method according to claim 1, wherein the performing, according to a difference between photographing views of the first image and the reference image, view conversion on the first feature map to obtain a second feature map after conversion comprises:

acquiring a first photographing parameter corresponding to the first image and a reference photographing parameter corresponding to the reference image;

determining a plurality of depth values corresponding to the convolutional layer that outputs the feature map set;

determining, according to a difference between the first photographing parameter and the second photographing parameter as well as the plurality of depth values, a plurality of view conversion matrices corresponding to the plurality of depth values; and performing, according to the plurality of view conversion matrices, view conversion on the first feature map respectively to obtain a plurality of second feature maps after conversion.

4. The depth image generation method according to claim 3, wherein the determining a plurality of depth values corresponding to the convolutional layer that outputs the feature map set comprises:

determining a depth layer number corresponding to the convolutional layer that outputs the feature map set; and dividing a preset depth range according to the depth layer number to obtain the plurality of depth values.

5. The depth image generation method according to claim 3, wherein the first image comprises a plurality of first images, and the performing fusion processing on the reference feature map and the second feature map to obtain the aggregated feature comprises:

performing fusion processing on a first quantity of reference feature maps to obtain a reference feature volume corresponding to the reference image, the first quantity being equal to the quantity of the plurality of depth values;

performing, for each first image, fusion processing on a plurality of second feature maps converted from the first feature maps corresponding to the first image to obtain first feature volumes, and determining differences between the first feature volumes and the reference feature volume as second feature volumes; and performing fusion processing on the plurality of determined second feature volumes to obtain the aggregated feature.

6. The depth image generation method according to claim 5, wherein the performing fusion processing on the plurality of determined second feature volumes to obtain the aggregated feature comprises:

acquiring a weight matrix corresponding to the convolutional layer that outputs the feature map set, the weight matrix comprising a weight corresponding to each pixel position in the feature map outputted by the convolutional layer; and performing weighted fusion processing on the plurality of second feature volumes according to the weight matrix to obtain the aggregated feature.

7. The depth image generation method according to claim 1, wherein scales of the feature maps outputted by the plurality of convolutional layers decrease sequentially; and the performing fusion processing on the plurality of obtained aggregated features to obtain a depth image comprises:

regarding an aggregated feature of the maximum scale in the plurality of aggregated features as a first aggregated feature, and regarding a plurality of other aggregated features in the plurality of aggregated features as second aggregated features;

performing multi-stage convolution processing on the first aggregated feature to obtain a plurality of third aggregated features, scales of the plurality of third aggregated features one-to-one corresponding to scales of the plurality of second aggregated features;

performing fusion processing on a second aggregated feature of a first scale and a third aggregated feature of the first scale, and performing deconvolution processing on the fused feature to obtain a fourth aggregated feature of a second scale, the first scale being a minimum scale of the plurality of second aggregated features, and the second scale being a previous-level scale of the first scale;

performing fusion processing continuously on the currently obtained fourth aggregated feature as well as the second aggregated feature and the third aggregated feature that are of scales equal to that of the fourth aggregated feature, and performing deconvolution processing on the fused feature to obtain a fourth aggregated feature of a previous-level scale, until a fourth aggregated feature with a scale equal to the scale of the first aggregated feature is obtained;

performing fusion processing on the fourth aggregated feature of the scale equal to that of the first aggregated feature and the first aggregated feature to obtain a fifth aggregated feature; and performing, according to a probability map corresponding to the first aggregated feature, convolution processing on the fifth aggregated feature to obtain the depth image.

8. The depth image generation method according to claim 7, wherein the continuously performing fusion processing on the currently obtained fourth aggregated feature as well as the second aggregated feature and the third aggregated feature that are of scales equal to that of the fourth aggregated feature, and performing deconvolution processing on the fused feature to obtain a fourth aggregated feature of a previous-level scale comprises:

performing fusion processing continuously on the currently obtained fourth aggregated feature as well as the second aggregated feature and the third aggregated feature that are of scales equal to that of the fourth aggregated feature, and a probability map of the second aggregated feature, and performing deconvolution processing on the fused feature to obtain the fourth aggregated feature of the previous-level scale.

9. The depth image generation method according to claim 1, wherein the acquiring a plurality of target images comprises:
photographing a target object from a plurality of different views to obtain the plurality of target images, or;
photographing the target object from a plurality of different views to obtain a plurality of original images, and
performing scale adjustment on the plurality of original images to obtain the plurality of target images, the plurality of target images are of equal scales.

10. The depth image generation method according to claim 9, wherein the performing scale adjustment on the plurality of original images to obtain the plurality of target images comprises:
performing a plurality of rounds of scale adjustment on the plurality of original images to obtain a plurality of target image sets, each target image set comprising a plurality of target images of a same scale, and target images in different target image sets being of different scales; and
the method further comprises performing fusion processing on depth images corresponding to the plurality of target image sets to obtain a fused depth image.

11. The depth image generation method according to claim 10, wherein the performing fusion processing on depth images corresponding to the plurality of target image sets to obtain a fused depth image comprises:
replacing, starting from a depth image of a minimum scale, a depth value of a second pixel corresponding to a first pixel in a depth image of a previous scale with a depth value of the first pixel meeting a preset condition in a current depth image, until a depth value in a depth image of a maximum scale is replaced, for obtaining a depth image after replacing the depth value of the depth image of the maximum scale.

12. The depth image generation method according to claim 11, further comprising:
mapping, for a first depth image and a second depth image of adjacent scales, any second pixel in the second depth image into the first depth image according to a pixel mapping relationship between the first depth image and the second depth image to obtain a first pixel, a scale of the second depth image being greater than a scale of the first depth image;
inversely mapping, according to the pixel mapping relationship, the first pixel into the second depth image to obtain a third pixel; and
determining, in response to a distance between the first pixel and the third pixel being less than a first preset threshold, that the first pixel corresponds to the second pixel.

13. A depth image generation apparatus, the apparatus comprising:
at least one memory configured to store computer program code; and
at least one processor configured to read the computer program code and operate as instructed by the computer program code, the computer program code comprising:
image acquisition code configured to cause the at least one processor to acquire a plurality of target images, the plurality of target images being obtained respectively by photographing a target object from different views;
convolution processing code configured to cause the at least one processor to perform multi-stage convolution processing on the plurality of target images through a plurality of convolutional layers in a convolution model to obtain feature map sets respectively outputted by the plurality of convolutional layers, each feature map set comprising feature maps corresponding to the plurality of target images;
view aggregation code configured to cause the at least one processor to perform view aggregation on a plurality of feature maps in each feature map set respectively to obtain an aggregated feature corresponding to each feature map set; and
feature fusion code configured to cause the at least one processor to perform fusion processing on the plurality of obtained aggregated features to obtain a depth image,
wherein the view aggregation code further comprises:
image determining code configured to cause the at least one processor to regard one of the target images as a reference image, and regard other target images in the plurality of target images as a first image; and
wherein the view aggregation code is further configured to cause the at least one processor to perform the following processing on any feature map set:
determine, in the feature map set, a reference feature map corresponding to the reference image and a first feature map corresponding to the first image;
perform, according to a difference between photographing views of the first image and the reference image, view conversion on the first feature map to obtain a second feature map after conversion; and
perform fusion processing on the reference feature map and the second feature map to obtain the aggregated feature.

14. The depth image generation apparatus according to claim 13, wherein the convolution processing code is further configured to cause the at least one processor to:
perform convolution processing on the plurality of target images through a first convolutional layer in first block convolution model to obtain a feature map set outputted by the first convolutional layer; and
perform, through a next convolutional layer in the convolution model, convolution processing on each feature map in the feature map set outputted by the previous convolutional layer to obtain a feature map set outputted by the next convolutional layer, until feature map sets outputted respectively by the plurality of convolutional layers are obtained.

15. The depth image generation apparatus according to claim 13,
wherein the view aggregation code is further configured to cause the at least one processor to:
acquire a first photographing parameter corresponding to the first image and a reference photographing parameter corresponding to the reference image;
determine a plurality of depth values corresponding to the convolutional layer that outputs the feature map set;
determine, according to a difference between the first photographing parameter and the second photographing parameter as well as the plurality of depth values, a plurality of view conversion matrices corresponding to the plurality of depth values; and
perform, according to the plurality of view conversion matrices, view conversion on the first feature map respectively to obtain a plurality of second feature maps after conversion.

16. The depth image generation apparatus according to claim 15, wherein the view aggregation code is further configured to cause the at least one processor to:
determine a depth layer number corresponding to the convolutional layer that outputs the feature map set; and
divide a preset depth range according to the depth layer number to obtain the plurality of depth values.

17. The depth image generation apparatus according to claim 15,
wherein the view aggregation code is further configured to cause the at least one processor to:
perform fusion processing on a first quantity of reference feature maps to obtain a reference feature volume corresponding to the reference image, the first quantity being equal to the quantity of the plurality of depth values;
perform, for each first image, fusion processing on a plurality of second feature maps converted from the first feature maps corresponding to the first image to obtain first feature volumes, and determining differences between the first feature volumes and the reference feature volume as second feature volumes; and
perform fusion processing on the plurality of determined second feature volumes to obtain the aggregated feature.

18. A non-transitory computer-readable storage medium, storing computer program code that when executed by at least one processor causes the at least one processor to:
acquire a plurality of target images, the plurality of target images being obtained respectively by photographing a target object from different views;
perform multi-stage convolution processing on the plurality of target images through a plurality of convolutional layers in a convolution model to obtain feature map sets respectively outputted by the plurality of convolutional layers, each feature map set comprising feature maps corresponding to the plurality of target images;
perform view aggregation on a plurality of feature maps in each feature map set respectively to obtain an aggregated feature corresponding to each feature map set; and
perform fusion processing on the plurality of obtained aggregated features to obtain a depth image,
wherein the perform view aggregation on a plurality of feature maps in each feature map set respectively to obtain an aggregated feature corresponding to each feature map set comprises:
regarding any one of the target images as a reference image, and regarding other target images in the plurality of target images as a first image;
performing the following processing on a feature map set:
determining, in the feature map set, a reference feature map corresponding to the reference image and a first feature map corresponding to the first image.

* * * * *